US012686415B2

(12) United States Patent
Kume et al.

(10) Patent No.: US 12,686,415 B2
(45) Date of Patent: Jul. 21, 2026

(54) AUTOMATED DRIVING CONTROL APPARATUS AND AUTOMATED DRIVING CONTROL PROGRAM

(71) Applicant: DENSO CORPORATION, Kariya-city (JP)

(72) Inventors: Takuya Kume, Kariya-city (JP); Kazuki Izumi, Kariya-city (JP)

(73) Assignee: DENSO CORPORATION, Kariya (JP)

( * ) Notice: Subject to any disclaimer, the term of this patent is extended or adjusted under 35 U.S.C. 154(b) by 158 days.

(21) Appl. No.: 18/506,676

(22) Filed: Nov. 10, 2023

(65) Prior Publication Data

US 2024/0075963 A1 Mar. 7, 2024

Related U.S. Application Data

(63) Continuation of application No. PCT/JP2022/017454, filed on Apr. 11, 2022.

(30) Foreign Application Priority Data

May 17, 2021 (JP) .................................. 2021-083381
Nov. 3, 2021 (JP) .................................. 2021-179891

(51) Int. Cl.
*B60W 60/00* (2020.01)
*B60W 40/08* (2012.01)
(Continued)

(52) U.S. Cl.
CPC ........ *B60W 60/0053* (2020.02); *B60W 40/08* (2013.01); *B60W 50/12* (2013.01); (Continued)

(58) Field of Classification Search
CPC .. B60W 60/0053; B60W 40/08; B60W 50/12; B60W 50/14; B60W 2050/146; B60W 2540/223; C08G 1/16
See application file for complete search history.

(56) References Cited

U.S. PATENT DOCUMENTS 8,352,110 B1 * 1/2013 Szybalski ............... G01S 19/10
701/41
2016/0207536 A1 * 7/2016 Yamaoka .............. B60W 50/10
(Continued)

FOREIGN PATENT DOCUMENTS

JP 2018027726 A 2/2018
JP 2019-142337 A 8/2019
(Continued)

OTHER PUBLICATIONS

Merged PE2E English Translation and Foreign JP 2018075849 (Year: 2018).*

(Continued)

*Primary Examiner* — James J Lee
*Assistant Examiner* — Andrew Sang Kim
(74) *Attorney, Agent, or Firm* — Harness, Dickey & Pierce, P.L.C.

(57) ABSTRACT

An automated driving control apparatus that enables traveling of a subject vehicle using an automated driving function is configured to grasp whether a driver of the subject vehicle grips a steering wheel, permit a transition from a driving assistance control with obligation for the driver to grip the steering wheel to an autonomous travel control, and cause a start notification to be issued to the driver. A hands-on notification that prompts the driver to grip the steering wheel is issued when it is grasped that the driver stops gripping the steering wheel during a period after at least one of transition conditions is satisfied and before the start notification is issued.

7 Claims, 12 Drawing Sheets

(51) Int. Cl.
    *B60W 50/12*         (2012.01)
    *B60W 50/14*         (2020.01)

(52) U.S. Cl.
    CPC ....... *B60W 50/14* (2013.01); *B60W 2050/146*
              (2013.01); *B60W 2540/223* (2020.02)

(56)                  References Cited

U.S. PATENT DOCUMENTS

| | | |
|---|---|---|
| 2018/0046185 A1 | 2/2018 | Sato et al. |
| 2019/0204827 A1* | 7/2019 | Bhalla .................. G05D 1/0061 |
| 2020/0307595 A1 | 10/2020 | Kato et al. |
| 2020/0307596 A1 | 10/2020 | Yashiro |
| 2020/0339147 A1 | 10/2020 | Hayakawa et al. |
| 2020/0398868 A1 | 12/2020 | Horii et al. |
| 2021/0053588 A1 | 2/2021 | Horiba et al. |
| 2021/0309246 A1* | 10/2021 | Sugano ................. B60W 40/08 |
| 2023/0150509 A1 | 5/2023 | Kato et al. |

FOREIGN PATENT DOCUMENTS

| | | |
|---|---|---|
| JP | 2020-160956 A | 10/2020 |
| JP | 2020-163907 A | 10/2020 |
| JP | 2021030836 A | 3/2021 |
| WO | WO-2019163010 A1 | 8/2019 |

OTHER PUBLICATIONS

Merged PE2E English Translation and Foreign JP 7018330 B2 (Year: 2018).*

* cited by examiner

FIG. 12

TRAFFIC CONGESTION PATTERN 5      TRAFFIC CONGESTION PATTERN 6

AUTOMATED DRIVING CONTROL APPARATUS AND AUTOMATED DRIVING CONTROL PROGRAM

CROSS REFERENCE TO RELATED APPLICATION

The present application is a continuation application of International Patent Application No. PCT/JP2022/017454 filed on Apr. 11, 2022 which designated the U.S. and claims the benefit of priority from Japanese Patent Application No. 2021-083381 filed on May 17, 2021 and Japanese Patent Application No. 2021-179891 filed on Nov. 3, 2021. The entire disclosures of all of the above applications are incorporated herein by reference.

TECHNICAL FIELD

The disclosure herein relates to an automated driving control apparatus and an automated driving control program that enable traveling of a subject vehicle using an automated driving function.

BACKGROUND

A related art discloses a control system for an automated driving vehicle. The control system permits a driver to be in a hands-off state in which the driver releases his/her hand from a steering wheel during automated driving.

SUMMARY

According to one example, an automated driving control apparatus that enables traveling of a subject vehicle using an automated driving function may be configured to grasp whether a driver of the subject vehicle grips a steering wheel, permit a transition from a driving assistance control with obligation for the driver to grip the steering wheel to an autonomous travel control, and cause a start notification to be issued to the driver. A hands-on notification that prompts the driver to grip the steering wheel is issued when it is grasped that the driver stops gripping the steering wheel during a period after at least one of transition conditions is satisfied and before the start notification is issued.

BRIEF DESCRIPTION OF DRAWINGS

Objects, features and advantages of the present disclosure will become more apparent from the following detailed description made with reference to the accompanying drawings. In the drawings:

Figure 12:
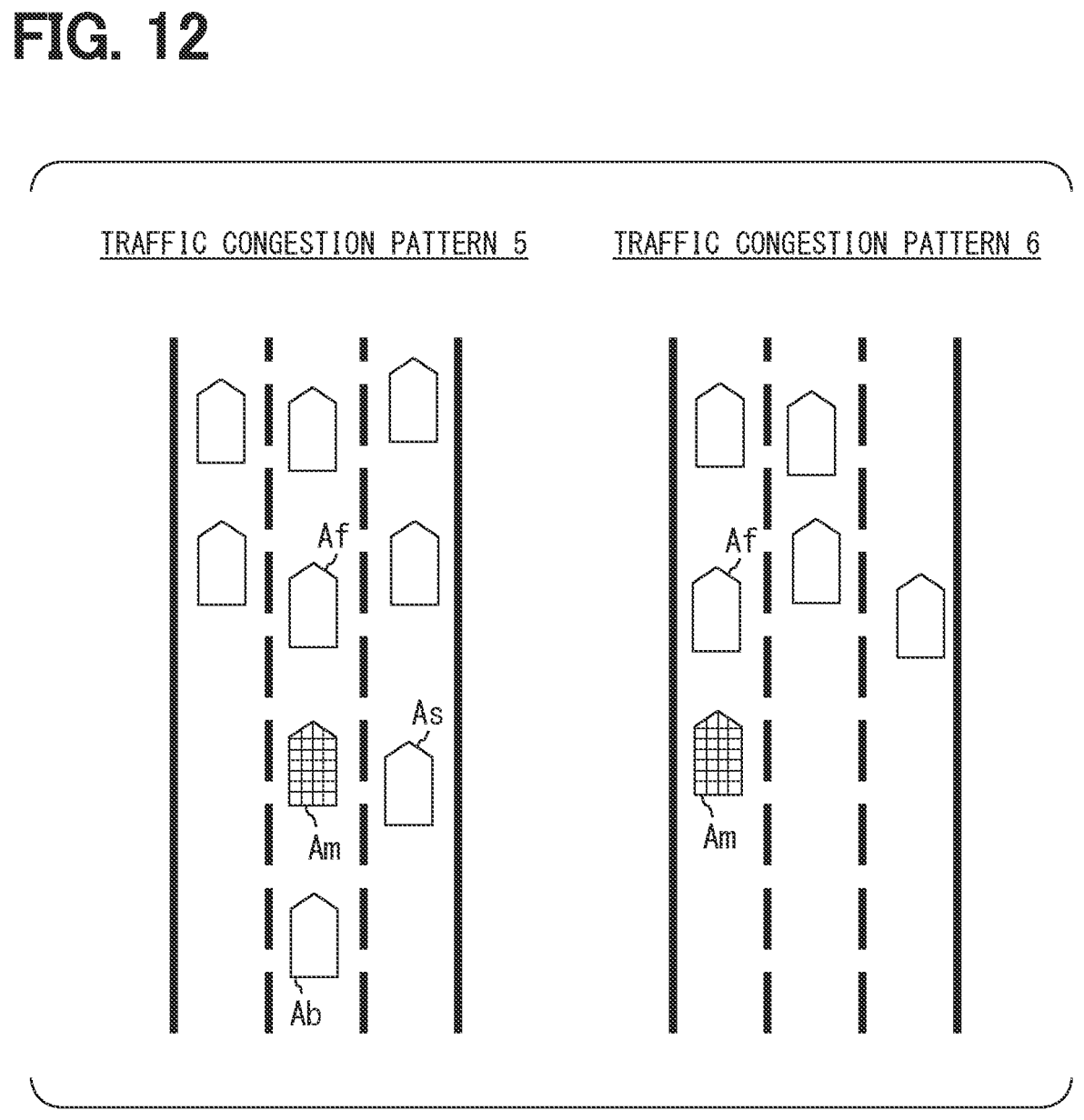

FIG. 12 is a diagram illustrating an example of a plurality of traffic congestion patterns grasped by a traffic congestion grasping section;

DETAILED DESCRIPTION

Figure 1:
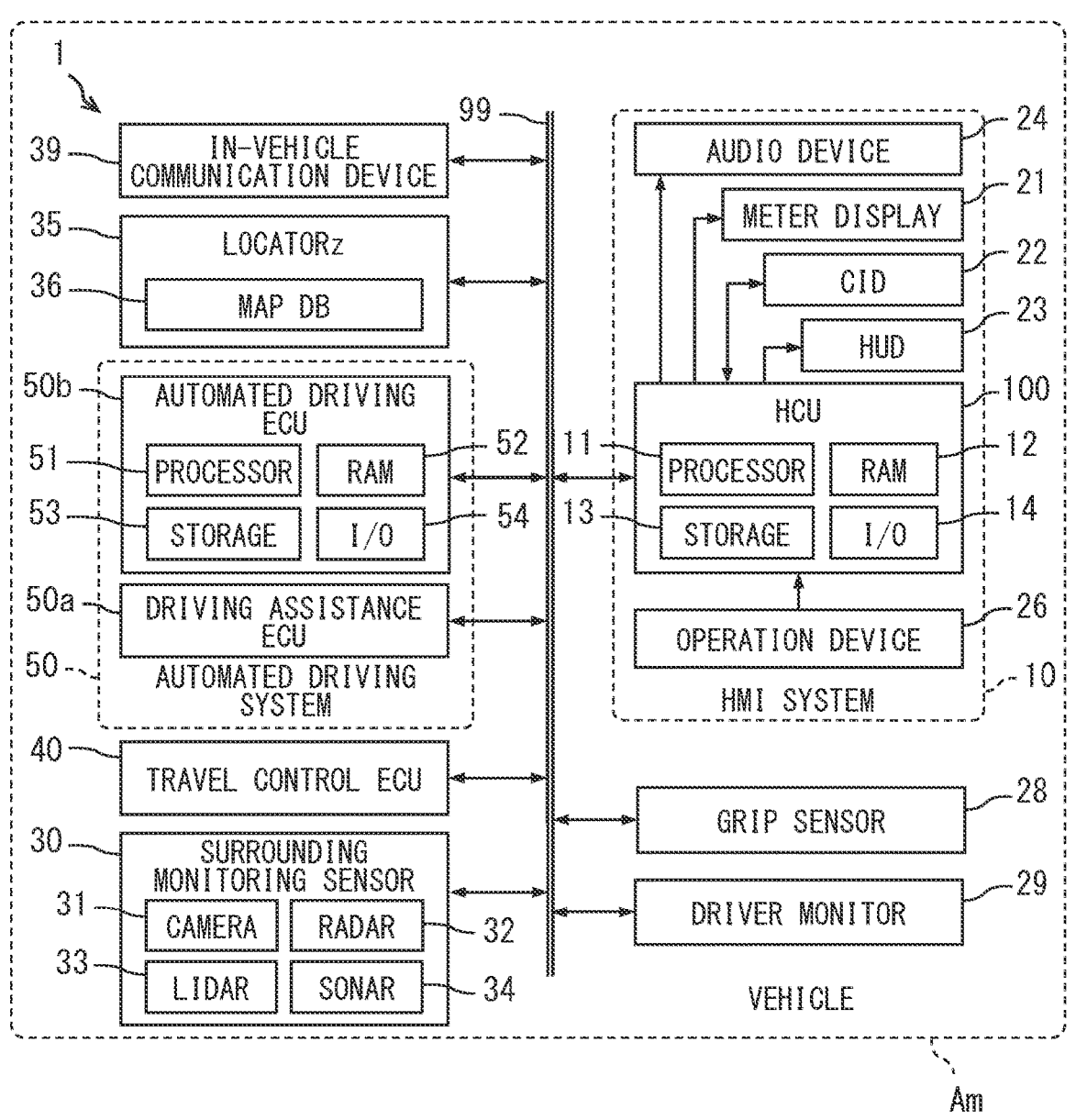
FIG. 1 is a diagram illustrating an overall image of an in-vehicle network including an automated driving ECU according to a first embodiment of the present disclosure.

The inventors of this application have found the following. In recent years, automated driving vehicles are permitted to be in an eyes-off state in which a driver has no obligation to monitor the surroundings in addition to the hands-off state. The automated driving vehicles as described above may cause a scene in which a state where the driver has obligation to grip the steering wheel transitions to a state where the driver has no obligation to not only grip the steering wheel but also monitor the surroundings, for example. The scene of a state transition of automated driving as described above causes the driver to be difficult to recognize an action to be performed. As a result, a smooth transition to control of automated driving without the obligation to monitor the surroundings may be hindered.

The present disclosure describes an automated driving control apparatus and an automated driving control program capable of smooth transition to automated driving without the obligation to monitor the surroundings.

According to one aspect of the present disclosure, an automated driving control apparatus that enables traveling of a subject vehicle using an automated driving function may be provided. The automated driving control apparatus includes a grip grasping section that is configured to grasp whether a driver of the subject vehicle grips a steering wheel, a control switching section that is configured to permit, based on that a plurality of transition conditions is satisfied, a transition from a driving assistance control with obligation for the driver to grip the steering wheel to an autonomous travel control without obligation for the driver to monitor surroundings and the obligation for the driver to grip the steering wheel, a notification control section that causes a start notification to be issued to the driver, the start notification indicating a start of the autonomous travel control. The notification control section issues a hands-on notification that prompts the driver to grip the steering wheel when it is grasped that the driver stops gripping the steering wheel during a period after at least one of the transition conditions is satisfied and before the start notification is issued.

According to another aspect of the present disclosure, a non-transitory computer readable storage medium storing an automated driving control program that enables traveling of a subject vehicle using an automated driving function may be provided. The automated driving control program causes at least one processor to perform the steps of: grasping whether a driver of the subject vehicle grips a steering wheel; permitting a transition from driving assistance control with obligation for the driver to grip the steering wheel to autonomous travel control without obligation for the driver to monitor surroundings and the obligation for the driver to grip the steering wheel based on that a plurality of transition conditions is satisfied; issuing a start notification to the driver, the start notification indicating a start of the autonomous travel control; and issuing a hands-on notification that prompts the driver to grip the steering wheel when it is grasped that the driver stops gripping the steering wheel during a period after at least one of the transition conditions is satisfied and before the start notification is issued.

These aspects cause hands-on notification to be issued to the driver to prompt the driver to grip the steering wheel when the driver stops gripping the steering wheel during a period until a start of autonomous travel control without the obligation to monitor the surroundings is issued. The hands-on notification as described above enables the driver to recognize an action to be performed before a transition to the autonomous travel control without the obligation to monitor the surroundings. As a result, the driver can continue to grip the steering wheel until the start of the autonomous travel control, and thus enabling a smooth transition to the automated driving without the obligation to monitor the surroundings.

According to another aspect of the present disclosure, an automated driving control apparatus that enables traveling of a subject vehicle using an automated driving function may be provided. The automated driving control apparatus includes a monitoring grasping section that is configured to grasp whether a driver of the subject vehicle monitors surroundings, a control switching section that is configured to permit a transition from driving assistance control with obligation for the driver to grip the steering wheel and obligation for the driver to monitor the surroundings to autonomous travel control without the obligation for the driver to grip the steering wheel and the obligation for the driver to monitor the surroundings based on that a plurality of transition conditions is satisfied, and a notification control section that is configured to cause a start notification to be issued to the driver, the start notification indicating a start of the autonomous travel control. The notification control section causes a monitoring request notification to be issued, the monitoring request notification prompting the driver to monitor the surroundings when it is grasped that the driver stops monitoring the surroundings during a period after at least one of the transition conditions is satisfied and before the start notification is issued.

According to another aspect of the present disclosure, a non-transitory computer readable storage medium storing an automated driving control program that enables traveling of a subject vehicle using an automated driving function may be provided. The automated driving control program causes at least one processor to perform the steps of: grasping whether a driver of the subject vehicle monitors surroundings; permitting a transition from driving assistance control with obligation for the driver to grip the steering wheel and obligation for the driver to monitor the surroundings to autonomous travel control without the obligation for the driver to grip the steering wheel and the obligation for the driver to monitor the surroundings based on that a plurality of transition conditions is satisfied; issuing a start notification to the driver, the start notification indicating a start of the autonomous travel control; and issuing a monitoring request notification that prompts the driver to monitor the surroundings when it is grasped that the driver stops monitoring the surroundings during a period after at least one of the transition conditions is satisfied and before the start notification is issued.

These aspects cause monitoring request notification to be issued to the driver to prompt the driver to monitor the surroundings when the driver stops monitoring the surroundings during a period until start notification of autonomous travel control without the obligation to monitor the surroundings is issued. The monitoring request notification as described above enables the driver to recognize an action to be performed before a transition to the autonomous travel control without the obligation to monitor the surroundings. As a result, the driver can continue to monitor the surroundings until the start of the autonomous travel control, and thus enabling a smooth transition to the automated driving without the obligation to monitor the surroundings.

According to another aspect of the present disclosure, an automated driving control apparatus that enables traveling of a subject vehicle using an automated driving function may be provided. The automated driving control apparatus includes a control switching section that is configured to permit a transition from driving assistance control with obligation for the driver of the subject vehicle to monitor surroundings to autonomous travel control without the obligation for the driver to monitor the surroundings, and a gripping obligation grasping section that is configured to grasp whether the driver has obligation to grip a steering wheel in the driving assistance control. The control switching section sets a condition for permitting a transition from the driving assistance control with the obligation to grip the steering wheel to the autonomous travel control stricter than a condition for permitting a transition from the driving assistance control without the obligation to grip the steering wheel to the autonomous travel control.

According to another aspect of the present disclosure, a non-transitory computer readable storage medium storing an automated driving control program that enables traveling of a subject vehicle using an automated driving function may be provided. The automated driving control program causes at least one processor to perform the steps of: permitting a transition from driving assistance control with obligation for a driver of the subject vehicle to monitor surroundings to autonomous travel control without the obligation for the driver to monitor the surroundings; grasping whether the driver has obligation to grip a steering wheel in the driving assistance control; and setting a condition for permitting a transition from the driving assistance control with the obligation to grip the steering wheel to the autonomous travel control stricter than a condition for permitting a transition from the driving assistance control without the obligation to grip the steering wheel to the autonomous travel control.

These aspects set the condition for permitting a transition from driving assistance control with the obligation to grip the steering wheel to the autonomous travel control more strictly than the condition for permitting a transition from driving assistance control without the obligation to grip the steering wheel to the autonomous travel control. Thus, the transition from the driving assistance control with the obligation to grip the steering wheel to the autonomous travel control can be performed under a traveling state where the driver has a lower load than in the transition from the driving assistance control without the obligation to grip the steering wheel to the autonomous travel control. As a result, the driver can release his/her hand from the steering wheel in a stable traveling state. Thus, the transition to the automated driving without the obligation to monitor the surroundings can be smoothly performed.

According to another aspect of the present disclosure, an automated driving control apparatus that enables traveling of a subject vehicle under driving assistance control without obligation for a driver to grip a steering wheel may be provided. The automated driving control apparatus includes an area determination section that is configured to determine whether an area where the subject vehicle travels is a hands-off available area allowing the subject vehicle to travel under hands-off control that is driving assistance control without obligation to grip a steering wheel, a notification control section that is configured to cause an area change notification to be issued, the area change notification indicating a change in a determination result of whether the area is the hands-off available area, and a function restriction section that is configured to restrict use of the hands-off control when the subject vehicle travels in a hands-off prohibited area in which traveling under the hands-off control is prohibited. The function restriction section continues a state in which the use of the hands-off control is restricted until a specific operation is performed by the driver when the subject vehicle moves from the hands-off prohibited area to the hands-off available area.

According to another aspect of the present disclosure, a non-transitory computer readable storage medium storing an automated driving control program that enables traveling of a subject vehicle under driving assistance control without obligation for a driver to grip a steering wheel may be provided. The automated driving control program causes at least one processor to perform the steps of: determining whether an area where the subject vehicle travels is a hands-off available area allowing the subject vehicle to travel under hands-off control that is driving assistance control without obligation to grip a steering wheel; causing an area change notification to be issued, the area change notification indicating a change in a determination result of whether the area is the hands-off available area; and restricting use of the hands-off control when the subject vehicle travels in a hands-off prohibited area in which traveling under the hands-off control is prohibited. When the subject vehicle moves from the hands-off prohibited area to the hands-off available area, the use of the hands-off control is continued in a restricted state until a specific operation is performed by the driver.

These aspects cause the area change notification to indicate a change in result of determining whether the subject vehicle travels in a hands-off available area. Thus, even in a travel environment in which propriety of traveling according to hands-off control changes as the subject vehicle moves, the driver can appropriately grasp whether the driver can release his/her hand from the steering wheel. As a result, convenience of the automated driving can be ensured.

Hereinafter, a plurality of embodiments will be described with reference to the drawings. Corresponding components in each embodiment may be denoted by identical reference numerals to eliminate duplicated description. When only a part of a configuration is described in each embodiment, the configuration includes another part to which a configuration of another embodiment described ahead can be applied. Additionally, combinations of configurations are applicable, the combinations including not only a combination of configurations clarified in descriptions of respective embodiments, but also a combination of parts of configurations of a plurality of embodiments, the parts being not clarified and the combination causing no problem.

First Embodiment

An automated driving control apparatus according to a first embodiment of the present disclosure has functions that are implemented by an automated driving electronic control unit (ECU) 50*b* illustrated in FIG. 1. The automated driving ECU 50*b* is mounted on a vehicle (referred to below as a subject vehicle Am) together with a driving assistance ECU 50*a*. The automated driving ECU 50*b* constitutes an automated driving system 50 of the subject vehicle Am together with the driving assistance ECU 50*a* and the like. The subject vehicle Am serves as an automated driving vehicle including an automated driving function by mounting the automated driving system 50.

The driving assistance ECU 50*a* is an in-vehicle ECU that implements a driving assistance function for assisting driving operation of a driver in the automated driving system 50. The driving assistance ECU 50*a* enables advanced driving assistance or partial automated driving of about a level 2 at an automated driving level defined by the American Society of Automotive Engineers. The driving assistance ECU 50*a* performs the automated driving with obligation to monitor the surroundings, the obligation requiring the driver to visually monitor the surroundings of the subject vehicle.

The automated driving ECU 50*b* is an in-vehicle ECU that implements an autonomous traveling function capable of performing driving operation on behalf of the driver. The automated driving ECU 50*b* is capable of performing autonomous traveling at a level 3 or higher at which control is mainly performed by a system. The automated driving ECU 50*b* performs automated driving that does not require monitoring of the surroundings of the subject vehicle, or that is an eyes-off automated driving without the obligation to monitor the surroundings.

The automated driving system 50 switches a travel control state of the automated driving function among a plurality of states including at least driving assistance control with the obligation to monitor the surroundings using the driving assistance ECU 50*a* and autonomous travel control without the obligation to monitor the surroundings using the automated driving ECU 50*b*. The description below shows automated driving control at the level 2 or lower using the driving assistance ECU 50*a* that is referred to as "driving assistance control", and automated driving control at the level 3 or higher using the automated driving ECU 50*b* that is referred to as "autonomous travel control". The automated driving ECU 50*b* may be capable of performing automated driving at a level 4 or higher.

During a period of automated traveling in which the subject vehicle Am travels under the autonomous travel control using the automated driving ECU 50*b*, the driver can be permitted to perform a specific action (referred to below as a second task) other than predetermined driving. The second task is legally permitted to the driver until the automated driving ECU 50*b* requires driving operation to be performed in cooperation with a human machine interface control unit (HCU) 100 described later, or requires substitution of driving. Assumed examples of the second task include viewing entertainment content such as moving image content, operation of a device such as a smartphone, and action such as eating.

Figure 2:
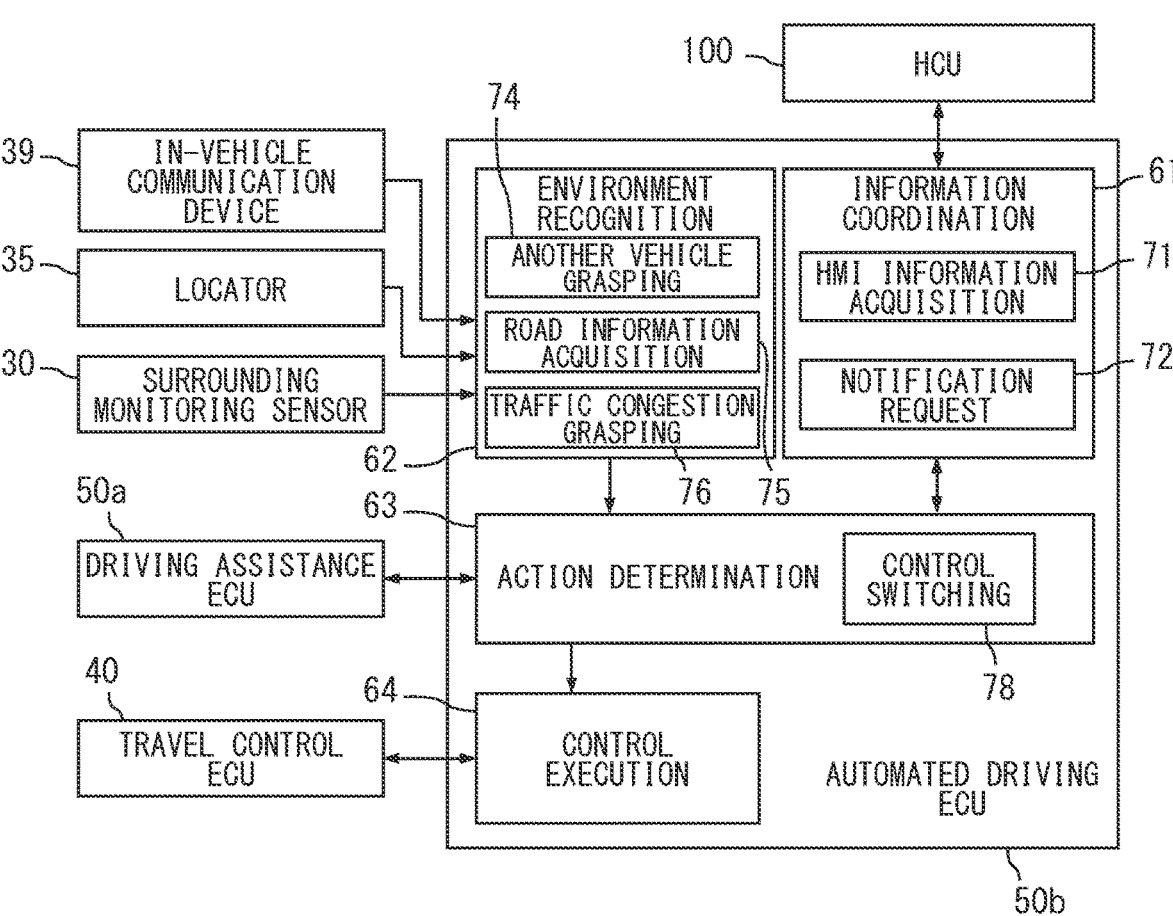
FIG. 2 is a block diagram illustrating details of an automated driving ECU.
Figure 3:
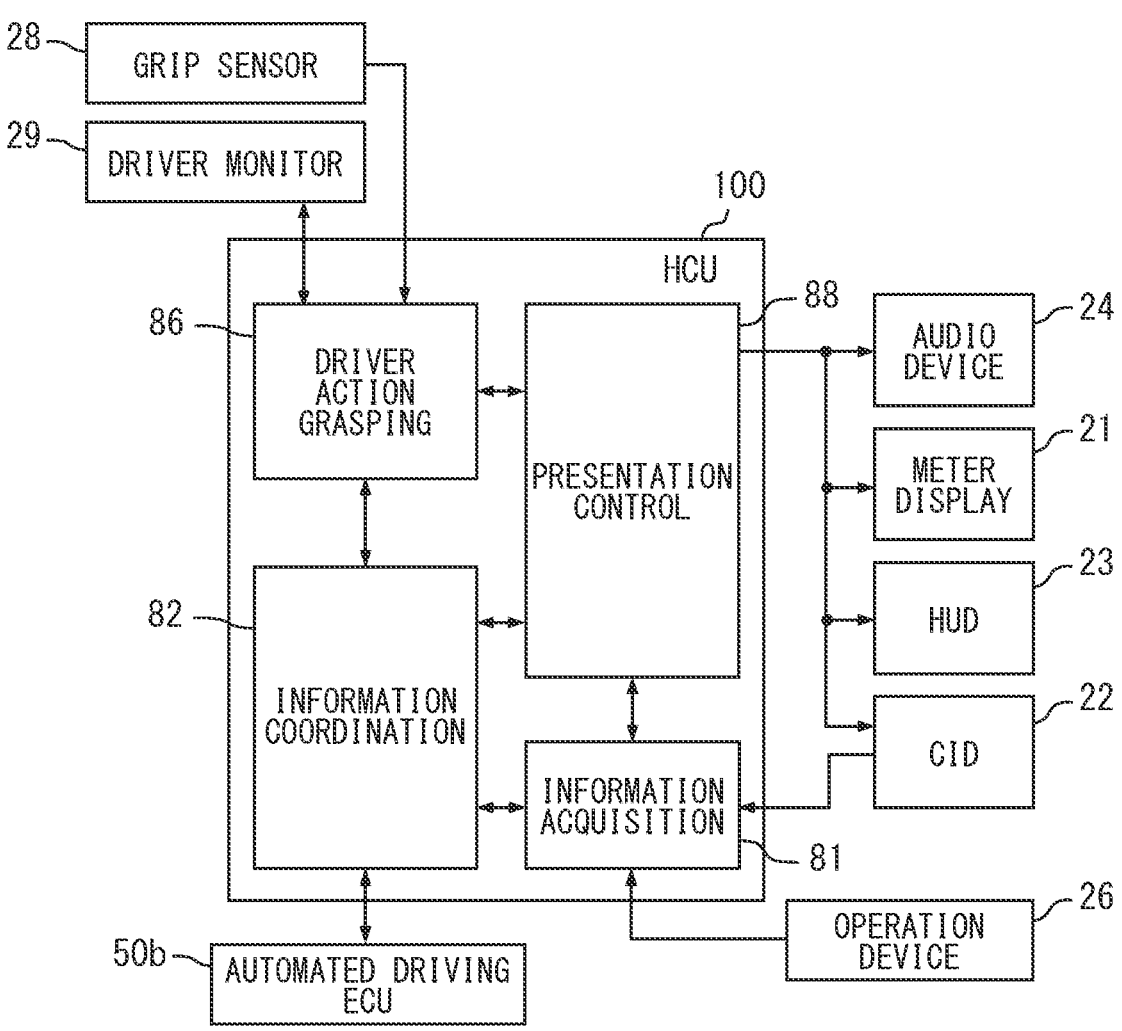
FIG. 3 is a block diagram illustrating details of an HCU.

The driving assistance ECU 50*a* and the automated driving ECU 50*b* are communicably connected to a communication bus 99 of an in-vehicle network 1 mounted on the subject vehicle Am. As illustrated in FIGS. 1 to 3, the communication bus 99 is connected to a grip sensor 28, a driver monitor 29, a surrounding monitoring sensor 30, a locator 35, an in-vehicle communication device 39, a travel control ECU 40, the HCU 100, and the like. The communication bus 99 is connected to nodes thereof that can communicate with each other. Specific nodes among these components such as the ECU may be electrically connected directly to each other to enable communicating with each other without passing through the communication bus 99.

The grip sensor 28 is a capacitive touch sensor, for example. The grip sensor 28 is provided on a rim portion of a steering wheel. The grip sensor 28 detects whether a driver grips the steering wheel. The grip sensor 28 provides the HCU 100 with grip detection information indicating whether the driver grips the steering wheel.

The driver monitor 29 includes a near-infrared light source, a near-infrared camera, and a control unit that controls these components. The driver monitor 29 is installed on an upper surface of a steering column portion or an upper surface of an instrument panel, for example, in an attitude in which the near-infrared camera faces a headrest of a driver's seat. The driver monitor 29 may be integrated with a meter display 21, a center information display (CID) 22, or the like to be described later, while being provided on any one of screens of the displays.

The driver monitor 29 allows the near-infrared camera to capture an image of the head of the driver irradiated with near-infrared light emitted by the near-infrared light source. The image captured by the near-infrared camera is subjected to image analysis using the control unit. The control unit extracts information such as a position and a line-of-sight direction of an eye point of the driver from the image captured. The driver monitor 29 provides the HCU 100, the automated driving ECU 50b, and the like with the information on a driver status extracted by the control unit.

The surrounding monitoring sensor 30 is an autonomous sensor that monitors a surrounding environment of the subject vehicle Am. The surrounding monitoring sensor 30 can detect a moving object and a stationary object from a detection range around the subject vehicle. The surrounding monitoring sensor 30 can detect at least other vehicles traveling around the subject vehicle Am, specifically, a preceding vehicle, a following vehicle, a laterally adjacent vehicle, and the like. The surrounding monitoring sensor 30 provides the driving assistance ECU 50a, the automated driving ECU 50b, and the like with detection information on an object around the subject vehicle.

The surrounding monitoring sensor 30 includes one or more of a camera unit 31, a millimeter wave radar 32, a lidar 33, and a sonar 34, for example. The camera unit 31 may include a monocular camera or a compound-eye camera. The camera unit 31 is mounted on the subject vehicle Am while being capable of capturing an image of a forward range of the subject vehicle Am. The subject vehicle Am may be equipped with the camera unit 31 capable of capturing images of a lateral range and a backward range of the subject vehicle Am. The camera unit 31 outputs at least one of imaging data obtained by capturing an image of the surroundings of the subject vehicle and an analysis result of the imaging data as detection information.

The millimeter wave radar 32 emits a millimeter wave or a quasi-millimeter wave toward the surroundings of the subject vehicle. The millimeter wave radar 32 outputs detection information generated by processing of receiving a reflected wave reflected by a moving object, a stationary object, or the like. The lidar 33 emits laser light toward the surroundings of the subject vehicle. The lidar 33 outputs detection information generated by processing of receiving laser light reflected by a moving object, a stationary object, or the like existing in an irradiation range. The sonar 34 emits an ultrasonic wave toward the surroundings of the subject vehicle. The sonar 34 outputs detection information generated by processing of receiving an ultrasonic wave reflected by a moving object, a stationary object, or the like existing near the subject vehicle.

The locator 35 includes a global navigation satellite system (GNSS) receiver, an inertial sensor, and the like. The locator 35 combines a positioning signal received by the GNSS receiver, a measurement result of the inertial sensor, vehicle speed information output to the communication bus 99, and the like to sequentially measure a position, a traveling direction, and the like of the subject vehicle Am. The locator 35 sequentially outputs position information and direction information on the subject vehicle Am based on the measurement result to the communication bus 99 as locator information.

The locator 35 further includes a map database (referred to below as a map DB) 36 storing map data. The map DB 36 mainly includes a large-capacity storage medium storing many pieces of three-dimensional map data and two-dimensional map data. The three-dimensional map data includes information necessary for advanced driving assistance and automated driving, such as three-dimensional shape information of a road and detailed information on each lane. The locator 35 reads out map data around a current position from the map DB 36, and provides the driving assistance ECU 50a, the automated driving ECU 50b, and the like with the map data together with the locator information.

The in-vehicle communication device 39 is an external communication unit mounted on the subject vehicle Am, and functions as a vehicle to everything (V2X) communication device. The in-vehicle communication device 39 transmits and receives information to and from a roadside device installed on a side of a road by wireless communication. For example, the in-vehicle communication device 39 receives information from the roadside device, the information being on traffic congestion around the current position and in a traveling direction of the subject vehicle Am. The information on traffic congestion is VICS (registered trademark) information or the like. The in-vehicle communication device 39 provides the automated driving ECU 50b and the like with the received information on traffic congestion.

The travel control ECU 40 is an electronic control device mainly including a microcontroller. The travel control ECU 40 has at least functions of a brake control ECU, a drive control ECU, and a steering control ECU. The travel control ECU 40 continuously performs braking force control of each wheel, output control of an in-vehicle power source, and steering angle control, based on any one of an operation command based on driving operation of the driver, a control command of the driving assistance ECU 50a, and a control command of the automated driving ECU 50b. The travel control ECU 40 also generates vehicle speed information indicating current traveling speed of the subject vehicle Am based on a detection signal of a wheel speed sensor provided in a hub portion of each wheel, and sequentially outputs the generated vehicle speed information to the communication bus 99.

The HCU 100 constitutes a human machine interface (HMI) system 10 together with a plurality of display devices, an audio device 24, an operation device 26, and the like. The HMI system 10 has an input interface function of receiving an operation of a passenger such as a driver of the subject vehicle Am and an output interface function of presenting information to the driver.

The display device presents information through vision of the driver using image display or the like. The display device includes the meter display 21, the CID 22, a head-up display (referred to below as an HUD) 23, and the like. The CID 22 has functions of a touch panel, and detects a touch operation of a driver or the like on a display screen. The audio device 24 includes a plurality of speakers installed in a vehicle interior in a placement surrounding the driver's seat, and causes the speakers to reproduce a notification sound, a voice message, or the like in the vehicle interior.

The operation device 26 is an input portion that receives a user operation of a driver or the like. The operation device 26 receives a user operation or the like related to operation and stop of the automated driving function, for example. For example, the operation device 26 receives a driver input for instructing a transition from the driving assistance control to the autonomous travel control. The operation device 26 includes a steering switch provided on a spoke portion of a steering wheel, an operation lever provided on a steering column portion, a voice input device that recognizes utterance content of a driver, and the like.

The HCU 100 functions as a presentation control device, and integrally manages presentation of information and the like related to automated driving to a driver. The HCU 100 requires substitution of driving for the driver based on a request to perform driving operation using the automated driving ECU 50*b*. The HCU 100 also permits a driver to perform the second task in cooperation with the automated driving ECU 50*b*, and thus enables reproducing moving image content or the like related to the second task without interfering with a requirement for substitution of driving.

The HCU 100 mainly includes a control circuit including a processor 11, a RAM 12, a storage 13, an input/output interface 14, a bus for connecting these, and the like. The processor 11 is hardware coupled to the RAM 12 to perform arithmetic processing. The processor 11 includes at least one of arithmetic cores such as a central processing unit (CPU) and a graphics processing unit (GPU). The processor 11 may further include a field-programmable gate array (FPGA), a neural network processing unit (NPU), an IP core having another dedicated function, and the like. The RAM 12 may include a video RAM for generating video data. The processor 11 performs various types of processing for implementing a presentation control method of the present disclosure by accessing the RAM 12. The storage 13 includes a nonvolatile storage medium. The storage 13 stores various programs (such as a presentation control program) to be executed by the processor 11.

The HCU 100 includes a plurality of functional sections that integrally controls information presentation to a driver by causing the processor 11 to execute a presentation control program stored in the storage 13. Specifically, the HCU 100 includes the functional sections such as an information acquisition section 81, an information coordination section 82, a driver action grasping section 86, and a presentation control section 88 (see FIG. 3).

The information acquisition section 81 acquires vehicle information indicating a state of the subject vehicle Am from the communication bus 99. The vehicle information includes vehicle speed information provided to the communication bus 99 by the travel control ECU 40, for example. The information acquisition section 81 also acquires operation information indicating content of user operation from the CID 22, the operation device 26, and the like.

The information coordination section 82 coordinates with an information coordination section 61 (described later) of the automated driving ECU 50*b* to enable information to be shared between the automated driving system 50 and the HCU 100. The information coordination section 82 provides the automated driving ECU 50*b* with operation information grasped by the information acquisition section 81, driver action information (described later) grasped by the driver action grasping section 86, and the like.

The information coordination section 82 acquires control status information indicating a state of the automated driving function to grasp an operation state of the automated driving by the automated driving system 50. Based on the control status information, the information coordination section 82 grasps whether the travel control in operation is the driving assistance control or the autonomous travel control, in other words, whether the travel control performed by the automated driving function requires a driver to have the obligation to monitor the surroundings.

The information coordination section 82 acquires a request to issue notification, the request being output by a notification request section 72 (described later) of the automated driving ECU 50*b*. The information coordination section 82 acquires requests from the automated driving ECU 50*b*, the requests including a request for the driver to require substitution of driving, and a request to issue transition notification from manual driving to the driving assistance control and a transition from the driving assistance control to the autonomous travel control. The information coordination section 82 controls content and timing of performing each notification in cooperation with the presentation control section 88 based on the request to issue each notification.

The driver action grasping section 86 grasps a state and action of a driver based on grip detection information acquired from the grip sensor 28 and driver status information acquired from the driver monitor 29. The driver action grasping section 86 grasps whether the driver grips a steering wheel (referred to below as a steering wheel), whether the driver monitors the surroundings of the subject vehicle Am, and the like. The driver action grasping section 86 also grasps content of the second task in operation by the driver during the automated driving period. The information coordination section 82 and the presentation control section 88 are provided with driver action information including information indicating whether the steering wheel is gripped, whether monitoring of the surroundings is performed, the content of the second task, and the like.

The presentation control section 88 integrally controls provision of information to a driver using each display device and the audio device 24. The presentation control section 88 provides content and information suitable for an operating state of the automated driving based on the control status information and the request to issue each notification acquired by the information coordination section 82, the driver action information grasped by the driver action grasping section 86, and the like. Specifically, the presentation control section 88 enables the display device to reproduce moving image content or the like when the information coordination section 82 grasps that the automated driving ECU 50*b* performs the autonomous travel control. The presentation control section 88 also notifies the driver of a requirement for substitution of driving (see FIG. 4) when the autonomous travel control without the obligation to monitor the surroundings is scheduled to be released.

Next, details of the driving assistance ECU 50*a* and the automated driving ECU 50*b* will be described in order.

The driving assistance ECU 50*a* is a computer mainly including a control circuit including a processor, a RAM, a storage, an input/output interface, a bus connecting these components, and the like. The driving assistance ECU 50*a* implements driving assistance functions such as adaptive cruise control (ACC), lane trace control (LTC), and lane change assist (LCA) by executing a program in the processor. For example, the driving assistance ECU 50*a* performs driving assistance control for causing the subject vehicle Am to travel along a subject vehicle lane in which the subject vehicle Am is traveling by cooperation of the functions of the ACC and the LTC.

The driving assistance ECU 50a of the first embodiment does not perform the driving assistance control at the level 2 in a hands-off state in which the driver is permitted to release his/her hand from the steering. That is, the driving assistance ECU 50a can perform only the driving assistance control at the level 2 in a hands-on state in which the driver grips the steering wheel.

The automated driving ECU 50b has higher calculation capability than the driving assistance ECU 50a, and can perform at least travel control corresponding to the ACC, the LTC, and the LCA. The automated driving ECU 50b may be capable of performing driving assistance control in which a driver is required to have the obligation to monitor the surroundings instead of the driving assistance ECU 50a in a scene or the like where the autonomous travel control is temporarily interrupted. The automated driving ECU 50b is a computer mainly including a control circuit including a processor 51, a RAM 52, a storage 53, an input/output interface 54, a bus connecting these components, and the like. The processor 51 performs various types of processing for implementing an automated driving control method of the present disclosure by accessing the RAM 52. The storage 53 stores various programs (such as an automated driving control program) to be executed by the processor 51. The programs executed by the processor 51 construct a plurality of functional sections for implementing the automated driving function in the automated driving ECU 50b, the functional sections including an information coordination section 61, an environment recognition section 62, an action determination section 63, and a control execution section 64 (see FIG. 2).

The information coordination section 61 provides information to the information coordination section 82 of the HCU 100 and acquires information from the information coordination section 82. Coordination between the information coordination sections 61 and 82 allows the automated driving ECU 50b and the HCU 100 to share the information acquired by each unit. The information coordination section 61 generates control status information indicating an operation state of the automated driving function, and provides the generated control status information to the information coordination section 82. The information coordination section 61 includes sub-function sections for information coordination, the sub-function sections including an HMI information acquisition section 71 and a notification request section 72.

The HMI information acquisition section 71 acquires operation information, driver action information, and the like from the information coordination section 82. The HMI information acquisition section 71 grasps user operation input to the CID 22, the operation device 26, and the like based on the operation information. For example, the HMI information acquisition section 71 grasps transition operation to the level 2 (see FIG. 4) of instructing a transition from the manual driving to the driving assistance control, transition operation to the level 3 (see FIG. 4) of instructing a transition from the driving assistance control to the autonomous travel control, and the like. The HMI information acquisition section 71 also grasps action of the driver during a period of each of the driving assistance and the automated traveling based on the driver action information. Specifically, the HMI information acquisition section 71 grasps whether the steering wheel is gripped, whether the driver performs monitoring of the surroundings, the content of the second task performed by the driver, and the like.

The HMI information acquisition section 71 may have a function similar to that of the driver action grasping section 86 of the HCU 100. More specifically, the HMI information acquisition section 71 may be capable of grasping details of action of the driver as with the driver action grasping section 86 by acquiring the grip detection information and the driver status information from the grip sensor 28 and the driver monitor 29, respectively.

The notification request section 72 enables notification using the HCU 100 synchronized with an operation state of the automated driving function by outputting a request to issue notification to the information coordination section 82. As described above, the notification request section 72 transmits the request to issue notification related to the automated driving to the information coordination section 82, the request including a request to require substitution of driving, a request to issue control transition notification, and the like.

The environment recognition section 62 combines the locator information and the map data acquired from the locator 35 with the detection information acquired from the surrounding monitoring sensor 30 to recognize a travel environment of the subject vehicle Am. The environment recognition section 62 also acquires vehicle information indicating a state of the subject vehicle Am from the communication bus 99. For example, the environment recognition section 62 acquires vehicle speed information indicating current traveling speed of the subject vehicle Am. The environment recognition section 62 includes sub-function sections for recognizing a travel environment, the sub-function sections including an another vehicle grasping section 74, a road information acquisition section 75, and a traffic congestion grasping section 76.

The another vehicle grasping section 74 grasps a relative position, a relative speed, and the like of a dynamic target around a subject vehicle, such as another vehicle traveling around the subject vehicle Am. The another vehicle grasping section 74 grasps at least a preceding vehicle and a following vehicle traveling in the same lane as the subject vehicle Am, a laterally adjacent vehicle traveling in a lane adjacent to the subject vehicle lane, and the like.

The road information acquisition section 75 grasps information on a road on which the subject vehicle Am travels. The road information acquisition section 75 grasps a type of a road on which the subject vehicle Am travels. For example, the road information acquisition section 75 grasps information on a shape of a road on which the subject vehicle Am travels, specifically, information indicating either a straight section or a curved section, a gradient of the road, and the like.

Figure 4:
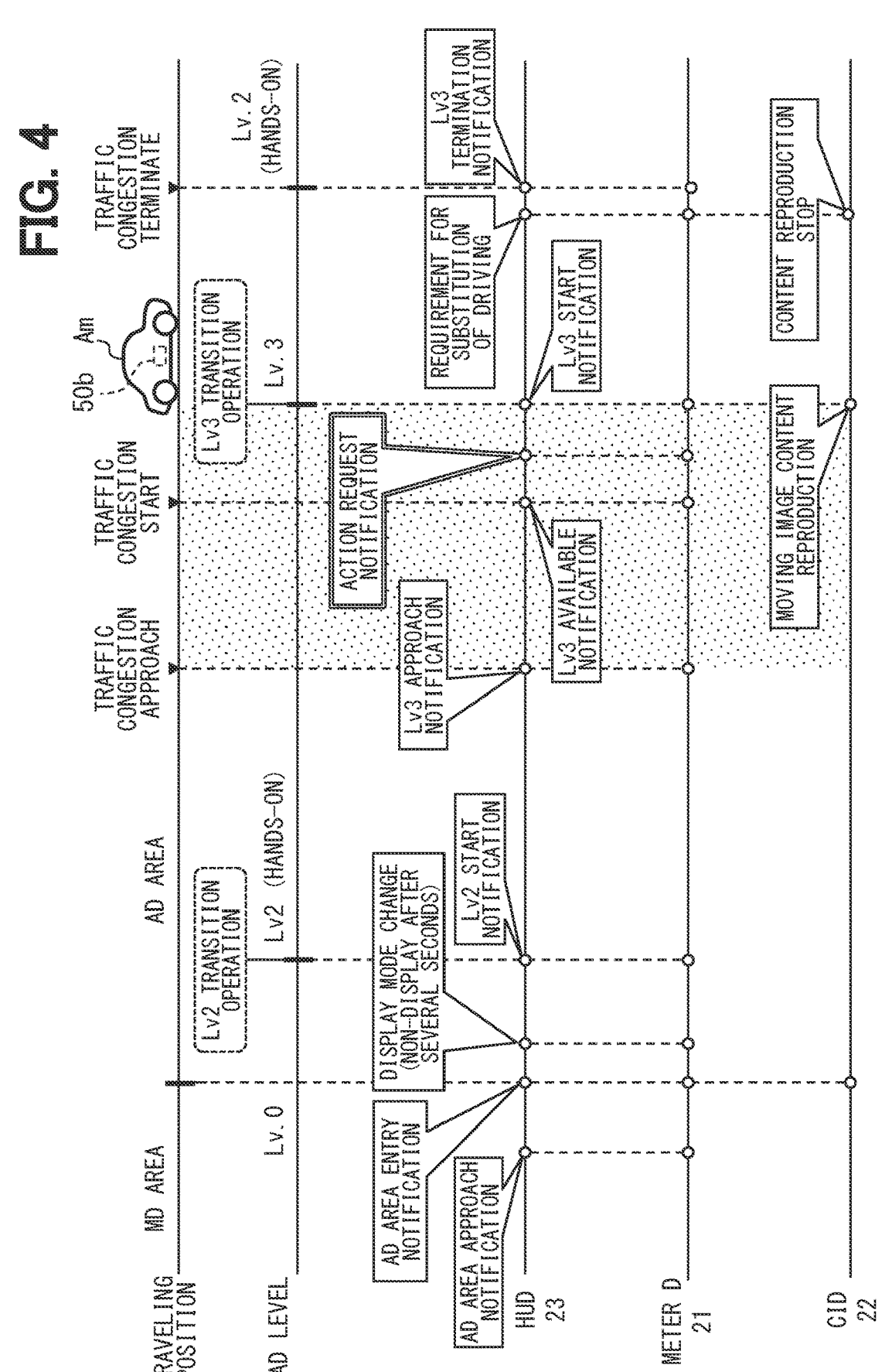
FIG. 4 is a time chart illustrating an example of notification performed by each display device.

The road information acquisition section 75 also determines whether a road on which the subject vehicle Am is traveling or a road on which the subject vehicle Am is scheduled to travel is a preset automated driving available area (referred to below as an AD area, see FIG. 4). The AD area permits traveling using an automated driving function. Examples of the AD area include an expressway, an automobile exclusive road, and the like. Then, the road information acquisition section 75 determines a road excluded from the AD area as a manual driving area (referred to below as an MD area, see FIG. 4) that does not permit traveling using the automated driving function. The MD area prohibits automated driving at the level 2 or higher from being performed. Even the MD area may permit use of a driving assistance function at about the level 1.

The traffic congestion grasping section 76 grasps traffic congestion around the subject vehicle Am by combining information on other vehicles grasped by the another vehicle grasping section 74 with vehicle speed information or the like grasped by the environment recognition section 62. The traffic congestion grasping section 76 may use traffic congestion information received by the in-vehicle communication device 39 to grasp the traffic congestion around the subject vehicle. When the traffic congestion grasping section 76 grapes traffic congestion around the subject vehicle Am in the AD area, automated traveling under the autonomous travel control can be performed, the autonomous travel control requiring no obligation to monitor the surroundings.

The traffic congestion grasping section 76 determines that the surroundings of the subject vehicle are in a traffic congestion state when the subject vehicle Am is traveling at a speed equal to or lower than traffic congestion speed (e.g., about 30 km/h) and both a preceding vehicle and a following vehicle travel in the subject vehicle lane. When traveling speed of the subject vehicle Am exceeds the traffic congestion speed after determination that the surroundings of the subject vehicle are in the traffic congestion state, the traffic congestion grasping section 76 predicts that the traffic congestion around the subject vehicle will clear. After predicting that the traffic congestion will clear, the traffic congestion grasping section 76 cancels the prediction that the traffic congestion will clear when vehicle speed of the subject vehicle Am decreases to equal to or lower than the traffic congestion speed again. Then, the traffic congestion grasping section 76 determines that the traffic congestion has cleared when the traveling speed of the subject vehicle Am or the preceding vehicle exceeds traffic congestion clear speed (e.g., about 50 km/h) after predicting that the traffic congestion will clear.

The action determination section 63 cooperates with the HCU 100 to control substitution of driving between the automated driving system 50 and the driver. When the automated driving system 50 has a right to control driving operation, the action determination section 63 generates a planned traveling line on which the subject vehicle Am travels based on a recognition result of a traveling environment, the recognition result being recognized by the environment recognition section 62, and outputs the generated planned traveling line to the control execution section 64. The action determination section 63 includes a control switching section 78 as a sub-function section for controlling an operation state of the automated driving function.

The control switching section 78 cooperates with the driving assistance ECU 50a to control a start and an end of the driving assistance control with obligation for the driver to monitor the surroundings. The control switching section 78 also cooperates with the driving assistance ECU 50a to switch control between the driving assistance control with the obligation for the driver to monitor the surroundings and the autonomous travel control without the obligation for the driver to monitor the surroundings. Specifically, the control switching section 78 sets a plurality of transition conditions for permitting a transition to the autonomous travel control. The transition conditions substantially coincide with conditions under which the traffic congestion grasping section 76 determines traffic congestion, and include a requirement regarding a traveling state of the subject vehicle Am and a requirement regarding a travel environment around the subject vehicle. Specifically, examples set as the transition conditions include a condition where traveling speed of the subject vehicle Am has decreased to a speed equal to or lower than the traffic congestion speed, and a condition where both a preceding vehicle and a following vehicle are present. Based on that all of the plurality of transition conditions are satisfied, the control switching section 78 permits the transition from the driving assistance control at the level 2 with obligation for a driver to not only grip the steering wheel but also monitor the surroundings to the autonomous travel control without the obligation for the driver to not only grip the steering wheel but also monitor the surroundings.

When the automated driving ECU 50b has a right to control driving operation, the control execution section 64 performs acceleration and deceleration control, steering control, and the like of the subject vehicle Am in accordance with the planned traveling line generated by the action determination section 63 in cooperation with the travel control ECU 40. Specifically, the control execution section 64 generates a control command based on the planned traveling line, and sequentially outputs the generated control command to the travel control ECU 40.

Next, details of a transition scene from manual driving (automated driving level 0) to driving assistance control, a transition scene from the driving assistance control to autonomous travel control, and a transition scene from the autonomous travel control to the driving assistance control will be described below with reference to FIG. 4 and FIGS. 1 to 3. Notification in each scene is performed by the HCU 100 based on a request to perform the notification, the request being output from the notification request section 72 to the information coordination section 82.

The HCU 100 in the transition scene from the manual driving to the driving assistance control issues AD area approach notification, AD area entry notification, level 2 start notification, and the like.

The AD area approach notification indicates the approach to the AD area to the driver during traveling in the MD area. The AD area approach notification is performed when the road information acquisition section 75 determines that a distance from the subject vehicle Am to the AD area is less than a threshold distance. The AD area approach notification causes a message indicating the approach to the AD area, such as "an automated driving available area comes soon", to be displayed on at least one of the HUD 23 and the meter display 21.

The AD area entry notification indicates entry into the AD area to the driver. The AD area entry notification is performed when the road information acquisition section 75 determines that the subject vehicle Am has entered the AD area after the AD area approach notification is issued. The AD area entry notification causes a message indicating a method for starting the automated driving at the level 2 (driving assistance control) to be displayed on at least one of the HUD 23, the meter display 21, and the CID 22. Examples of display of the AD area entry notification include character information such as "automated driving mode", character information such as "ENTER" indicating input to the operation device 26, and an arrow image indicating the "ENTER". The HUD 23 and the meter display 21 may change the display of the AD area entry notification to a display mode with low visibility or may hide the display after a predetermined time (e.g., several seconds) has elapsed from a start of the display, for example.

The level 2 start notification indicates a start of the driving assistance control at the level 2 to the driver. The level 2 start notification is performed in accordance with the start of the driving assistance control at the level 2 when the HMI information acquisition section 71 recognizes input of operation of a transition to the level 2, the operation being performed by the driver. The level 2 start notification allows at least one of the HUD 23 and the meter display 21 to display character information related to the start of the automated driving, such as a message, "Automated driving will be released depending on surrounding road conditions".

The HCU 100 in the transition scene from the driving assistance control to the autonomous travel control issues level 3 approach notification, level 3 available notification, level 3 start notification, and the like.

The level 3 approach notification indicates to the driver that automated driving at the level 3 (autonomous travel control) is about to be available. The level 3 approach notification is performed based on that conditions of prediction about a transition to the autonomous travel control are satisfied. For example, when approach to traffic congestion is estimated, in other words, when at least one of the plurality of transition conditions set in the control switching section 78 is satisfied, the level 3 approach notification is performed. The level 3 approach notification may be also performed even when the in-vehicle communication device 39 receives information on traffic congestion ahead of the subject vehicle. The level 3 approach notification allows at least one of the HUD 23 and the meter display 21 to display a message such as "Second task is available in forward traffic congestion".

The level 3 available notification indicates to the driver that the autonomous travel control at the level 3 becomes available. The level 3 available notification is performed when the control switching section 78 determines that all the transition conditions are satisfied. The level 3 available notification allows at least one of the HUD 23 and the meter display 21 to display a message such as "second task becomes available", for example.

The level 3 start notification indicates a start of the autonomous travel control at the level 3 to the driver. The level 3 start notification is performed in accordance with the start of the autonomous travel control at the level 3 when the HMI information acquisition section 71 recognizes input of operation of a transition to the level 3, the operation being performed by the driver. The level 3 start notification allows at least one of the HUD 23 and the meter display 21 to display a message related to the automated driving at the level 3, such as "Be careful of information from vehicle. Automated driving will be released depending on surrounding road conditions", for example. Additionally, the level 3 start notification allows the CID 22 to reproduce a video content.

The HCU 100 in the transition scene from the autonomous travel control to the driving assistance control requires substitution of driving and issues level 3 termination notification.

The requirement for substitution of driving is a notification indicating to the driver that the autonomous travel control at the level 3 is scheduled to end, in other words, the right to control the driving operation needs to be transferred. The substitution of driving is required based on a prediction of an end of the autonomous travel control, such as an end of the AD area or an end of a traffic congestion section. Examples of display of the requirement for substitution of driving include a message such as "Automated driving will be released. Grip the steering wheel" on at least one of the HUD 23 and the meter display 21. Additionally, the requirement for substitution of driving causes the CID 22 to stop reproducing a video content.

The level 3 termination notification indicates a transition from the autonomous travel control at the level 3 to the driving assistance control in a hands-on state to the driver.

The level 3 termination notification is performed in synchronization with switching of the travel control state using the control switching section 78. The level 3 termination notification allows at least one of the HUD 23 and the meter display 21 to display a message indicating an end of the automated driving, such as "Automated driving is about to be released", for example.

It may be here assumed that the driver fails to correctly grasp a state of travel control performed by the automated driving ECU 50b from each notification. For example, the driver may erroneously recognize the level 3 approach notification or the level 3 available notification as the level 3 start notification. In this case, the driver, who has erroneously recognized that the autonomous travel control at the level 3 has been started, may stop required operations such as gripping the steering wheel and monitoring the surroundings of the subject vehicle.

To prevent such erroneous recognition of the driver, each of the automated driving ECU 50b and the HCU 100 issues an action request notification for requesting the driver to take a correct action when recognizing an inappropriate action of the driver during a period after a start of the level 3 approach notification and before a start of the level 3 start notification.

Specifically, the action request notification can be issued in a period (referred to below as a period before a transition to the level 3, see a dotted range in FIG. 4) from timing at which at least one transition condition is satisfied to timing at which input of operation of a transition to the level 3 is grasped. The action request notification is issued based on an action of the driver grasped by the HMI information acquisition section 71. Specifically, when the HMI information acquisition section 71 grasps that the driver stops gripping the steering wheel in the period before a transition to the level 3, hands-on notification is issued as the action request notification. When the HMI information acquisition section 71 grasps that the driver stops monitoring the surroundings during the period before transition to level 3, monitoring request notification is issued as the action request notification.

The hands-on notification prompts the driver to grip the steering wheel. The hands-on notification allows at least one of the HUD 23 and the meter display 21 to display an alert message such as "Operate steering wheel" and an alert image including "!", for example. The hands-on notification also allows the audio device 24 to reproduce a voice message similar to the alert message displayed on the display device. The hands-on notification is continued until each of the driver action grasping section 86 and the HMI information acquisition section 71 grasps that the driver grips the steering wheel.

The monitoring request notification prompts the driver to monitor the surroundings. The monitoring request notification allows at least one of the HUD 23 and the meter display 21 to display an alert message such as "Check surroundings of subject vehicle" and an alert image including "!", for example. The monitoring request notification also allows the audio device 24 to reproduce a voice message similar to the alert message displayed on the display device. The monitoring request notification is continued until each of the driver action grasping section 86 and the HMI information acquisition section 71 grasps that the driver restarts monitoring of the surroundings.

Next, details of driving control switching processing performed in the above transition scene from the driving assistance control to the autonomous travel control will be described below with reference to FIGS. 5 and 6 and FIGS.

1 to 4. The driving control switching processing is started by the automated driving ECU 50b based on a start of traveling under the driving assistance control.

The control switching section 78 in S101 determines whether the transition condition to the autonomous travel control is satisfied. When it is determined in S101 that at least one of the plurality of transition conditions set is satisfied, the processing proceeds to S102. In contrast, when it is determined that all the transition conditions are not satisfied, the determination in S101 is repeated. The level 3 approach notification is issued in S102, and the processing proceeds to S103.

The HMI information acquisition section 71 in S103 grasps whether the driver grips the steering wheel based on the driver action information. When it is determined in S103 that the driver keeps gripping the steering wheel (the hands-on state), the processing proceeds to S104. In contrast, when it is determined in S103 that the driver stops gripping the steering wheel, the processing proceeds to S112.

The HMI information acquisition section 71 in S104 grasps whether the driver monitors the surroundings based on the driver action information. When it is determined in S104 that the driver continues to monitor the surroundings, the processing proceeds to S105. In contrast, when it is determined that the driver stops monitoring the surroundings in S104, the processing proceeds to S112.

The control switching section 78 in S105 determines whether all of the plurality of transition conditions preset are satisfied. When it is determined that there is an unsatisfied transition condition, the determinations of S103 to S105 are repeated. In contrast, when it is determined that all the transition conditions are satisfied, the transition is permitted from the driving assistance control with the obligation to not only monitor the surroundings but also grip the steering wheel to the autonomous travel control without the obligation to not only monitor the surroundings but also grip the steering wheel, and the processing proceeds to S106. The level 3 available notification is issued in S106, and the processing proceeds to S107.

As in S103, it is grasped in S107 whether the driver grips the steering wheel. When it is determined that the hands-on state is continued in S107, the processing proceeds to S108. In contrast, when it is determined in S107 that the driver stops gripping the steering wheel, the processing proceeds to S112.

As in S104, it is grasped in S108 whether the driver monitors the surroundings. When it is determined in S108 that the driver continues to monitor the surroundings, the processing proceeds to S109. In contrast, when it is determined that the driver stops monitoring the surroundings in S108, the processing proceeds to S112.

The HMI information acquisition section 71 in S109 determines whether the driver inputs operation of a transition to the level 3 based on the operation information. When input of the operation of a transition to the level 3 is not grasped, the determinations of S107 to S109 are repeated. In contrast, when the input of the operation of a transition to the level 3 is recognized, the transition from the driving assistance control in the hands-on state to the autonomous travel control in the eyes-off state is determined, and the processing proceeds to S110. The level 3 start notification is issued in S110, and the processing proceeds to S111. The control switching section 78 in S111 performs a transition to the autonomous travel control at the level 3, and terminates a series of driving control switching processing. The processing in each of S110 and S111 may be performed substantially simultaneously.

The control switching section 78 stops (cancels) the transition to the autonomous travel control at the level 3 in S112 when an undesirable action of the driver is recognized in a period before transition to the level 3, and the processing proceeds to S113. The action request notification for prompting the driver to improve the action is issued in S113, and the processing proceeds to S114. When it is grasped that the driver stops gripping the steering wheel in the period before transition to the level 3, the hands-on notification for prompting the driver to grip the steering wheel is issued in S113. Then, when it is grasped that the driver stops monitoring the surroundings in the period before transition to the level 3, the monitoring request notification for prompting the driver to monitor the surroundings in is issued in S113. When the driver stops gripping the steering wheel and monitoring the surroundings, the hands-on notification and the monitoring request notification may be alternately or simultaneously issued in S113.

It is determined in S114 whether the driver correctly acts using the HMI information acquisition section 71 based on the driver action information. When the hands-on notification is issued in S113, it is determined in S114 whether the driver restarts gripping of the steering wheel. Then, when surrounding monitoring notification is issued in S113, it is determined in S114 whether the driver restarts monitoring of the surroundings. When it is grasped in S114 that the driver correctly acts, the processing proceeds to S115.

The control switching section 78 in S115 determines to continue the driving assistance control at the level 2, and the processing proceeds to S116. The control switching section 78 in S116 sets a transition restriction to the autonomous travel control at the level 3, and terminates a series of driving control switching processing. The transition restriction set in S116 prohibits use of the automated driving function at the level 3 for a predetermined time (e.g., about 10 minutes) until the vehicle exits a traffic congestion section in which the vehicle is traveling, or until the vehicle exits the AD area in which the vehicle is traveling, for example, and thus the level 3 available notification is not issued.

As described above, when the hands-on notification or the monitoring request notification is issued, the control switching section 78 suspends permission of the transition to the autonomous travel control even when the transition to the autonomous travel control at the level 3 becomes available after the plurality of transition conditions are satisfied. As a result, the state in which the autonomous travel control cannot be used continues at least for a predetermined time. Instead of the transition restriction set by the control switching section 78, issuance of the level 3 available notification and the level 3 start notification may be stopped for a predetermined time by processing of the notification request section 72 in which output of a request to issue the level 3 available notification and the level 3 start notification is suspended.

In contrast, when it is not grasped in S114 that the driver correctly acts, elapsed time from a start of the action request notification is grasped in S117. When it is determined in S117 that the elapsed time after the start of the action request notification does not exceed a predetermined time (e.g., about 5 to 10 seconds), the processing returns to S114 to wait for action of the driver. In contrast, when it is determined in S117 that the elapsed time after the start of the action request notification exceeds the predetermined time, the processing proceeds to S118.

The control switching section 78 in S118 performs a transition to minimum risk maneuver (MRM), and terminates a series of driving control switching processing. For example, the MRM is performed in S118 to perform travel control for automatically stopping the subject vehicle Am in a straight section grasped by the road information acquisition section 75, or travel control for moving and stopping the subject vehicle Am in an evacuation place of a road shoulder grasped by the environment recognition section 62.

The first embodiment described above causes the hands-on notification to be issued, the hands-on notification prompting the driver to grip the steering wheel, when the driver stops gripping the steering wheel during a period until the level 3 start notification is issued. The hands-on notification as described above enables the driver to recognize an action to be performed before a transition to the autonomous travel control without the obligation to monitor the surroundings. In other words, the driver is less likely to erroneously recognize a state of travel control being performed by the automated driving ECU 50b. As a result, the driver can continue to hold the steering wheel until the start of the autonomous travel control, and thus enabling a smooth transition to the automated driving at the level 3 without the obligation to monitor the surroundings.

The first embodiment also causes the monitoring request notification to be issued to the driver to prompt the driver to monitor the surroundings when the driver stops monitoring the surroundings during a period until the level 3 start notification is issued. The monitoring request notification as described above enables the driver to recognize an action to be performed before a transition to the autonomous travel control without the obligation to monitor the surroundings. As a result, the driver can continue to monitor the surroundings until the start of the autonomous travel control, and thus enabling a smooth transition to the automated driving at the level 3 without the obligation to monitor the surroundings.

The first embodiment also causes the transition to the autonomous travel control to be stopped when it is grasped that the driver stops gripping the steering wheel during a period after at least one transition condition is satisfied and before the level 3 start notification is issued. Similarly, the transition to the autonomous travel control is also stopped when it is grasped that the driver stops monitoring the surroundings during the period after at least one transition condition is satisfied and before the level 3 start notification is issued.

As described above, performing processing of canceling the transition to the autonomous travel control and intentionally impairing convenience of the driver enables the driver to strongly recognize undesirable actions of releasing the hand from the steering wheel and stopping monitoring the surrounding before the level 3 start notification is issued. As a result, the driver is likely to continue gripping the steering wheel and monitoring the surroundings until the level 3 start notification is issued, in the next and subsequent transition scenes. Thus, the transition to the automated driving at the level 3 without the obligation to monitor the surroundings can be further smoothly performed.

The first embodiment allows the driving assistance control at the level 2 in the hands-on state to be continued when it is grasped that the driver grips the steering wheel within a predetermined time after the start of the hands-on notification. Similarly, the driving assistance control at the level 2 in the hands-on state is continued even when it is grasped that the driver monitors the surroundings within a predetermined time after a start of the monitoring request notification. As described above, even when the transition to the autonomous travel control at the level 3 is canceled, continuing the driving assistance control at the level 2 enables the driver to continue driving operation without being confused by the transition of the travel control state.

The first embodiment further restricts the transition to the autonomous travel control at the level 3 when the driving assistance control at the level 2 is continued based on grasping that the steering wheel is gripped. Similarly, the transition to the autonomous travel control of level 3 is restricted when the driving assistance control at the level 2 is continued based on grasping that the surroundings are monitored. Specifically, when the hands-on notification is issued, permission of the transition to the autonomous travel control is suspended after a plurality of transition conditions is satisfied. Alternatively, issuance of the level 3 start notification is stopped for a predetermined time, when the hands-on notification is issued.

As described above, processing of restricting re-transition to the autonomous travel control at the level 3 once canceled and intentionally impairing convenience of the driver enables the driver to strongly recognize undesirable actions of stopping not only gripping the steering but also monitoring the surroundings before the level 3 start notification is issued. As a result, the driver is likely to continue an appropriate action until the level 3 start notification is issued, and thus enabling the transition to the automated driving at the level 3 without the obligation to monitor the surroundings to be more smoothly performed in the next and subsequent transition scenes.

The first embodiment shows the automated driving ECU 50b that corresponds to the "automated driving control apparatus", the HMI information acquisition section 71 that corresponds to a "grip grasping section" and a "monitoring grasping section", and the notification request section 72 that corresponds to a "notification control section".

Second Embodiment

Figure 7:
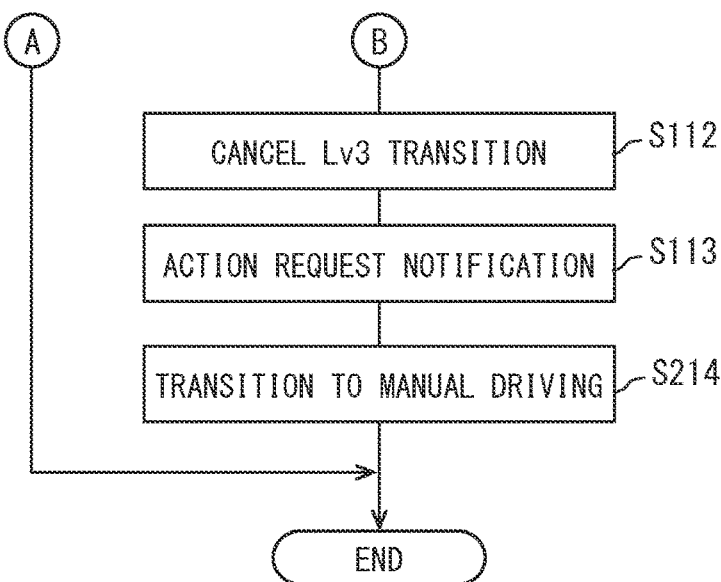
FIG. 7 is a flowchart illustrating details of driving control switching processing according to a second embodiment together with FIG. 5.
Figure 8:
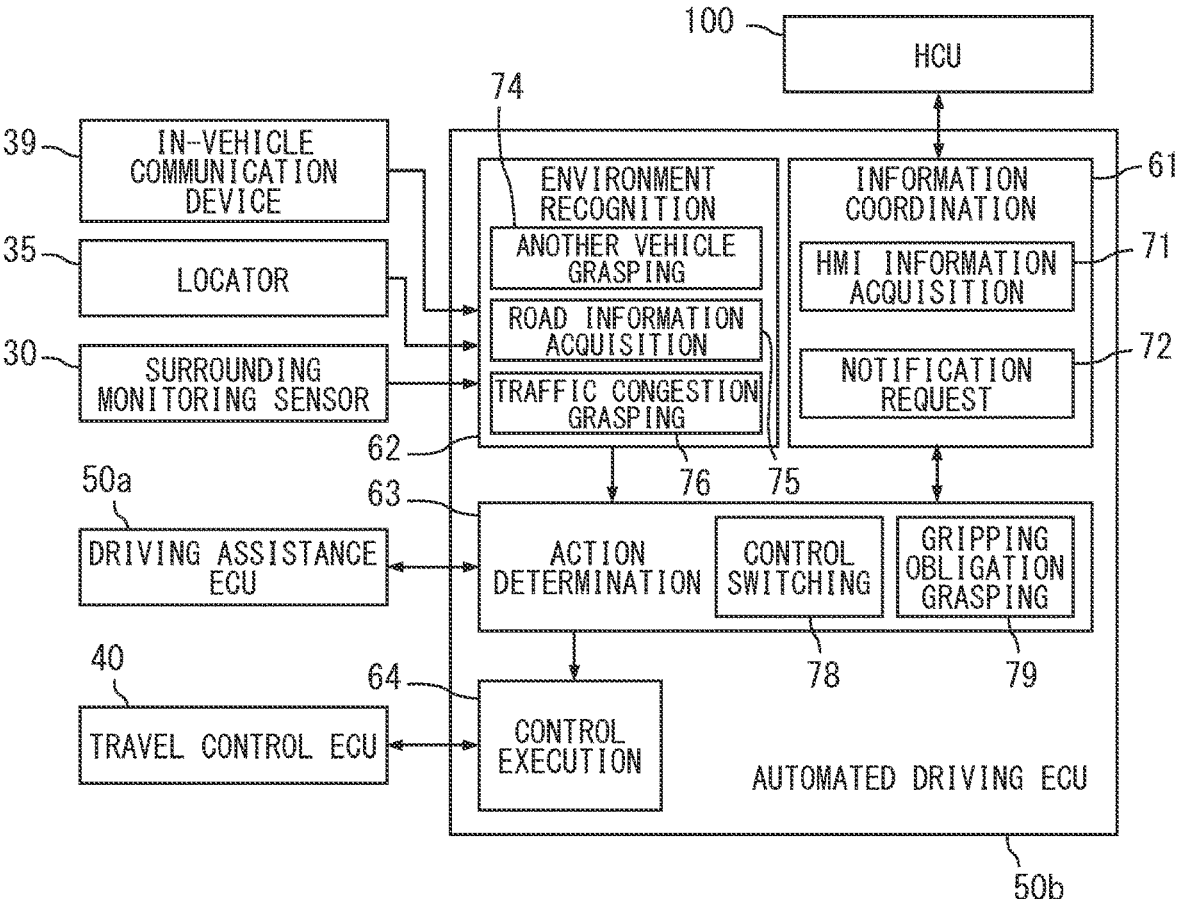
FIG. 8 is a block diagram illustrating details of an automated driving ECU according to a third embodiment.
Figure 9:
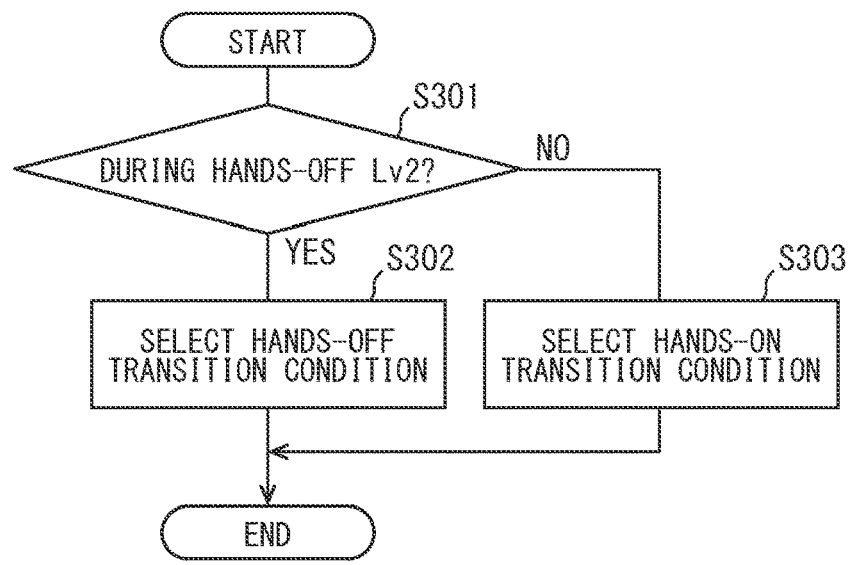
FIG. 9 is a flowchart illustrating details of transition condition setting processing performed by an automated driving ECU.

A second embodiment of the present disclosure is a modification of the first embodiment. FIGS. 5 and 7 each illustrate a driving control switching processing of the second embodiment in which when an undesirable action of a driver is recognized in a period before transition to the level 3, a control switching section 78 causes a control state to transition to manual driving.

Specifically, when a hands-on state of a driver is interrupted in a period before transition to the level 3 (S103 or S107: NO) or when surrounding monitoring of the driver is interrupted, the control switching section 78 stops transition to autonomous travel control at the level 3 as in the first embodiment (S112). Then, a notification request section 72 issues an action request notification for prompting the driver to improve own action by outputting a request for issuance to an HCU 100 (S113). After the action request notification is issued, the control switching section 78 terminates driving assistance control at the level 2 and causes the control state to transition to the manual driving to be performed by the driver (S214).

Even the second embodiment described up to here achieves an effect as in the first embodiment, and thus enabling the driver to recognize action to be performed in a period before transition to the level 3 by the hands-on notification or the monitoring request notification issued as the action request notification. As a result, the transition to automated driving at the level 3 without the obligation to monitor the surroundings can be smoothly performed.

The second embodiment also allows the driving assistance control to be switched to the manual driving to be performed by the driver when the transition to the autonomous travel control at the level 3 is canceled. The transition to the manual driving as described above enables the driver to be strongly impressed with that releasing the hand from the steering wheel and stopping the surrounding monitoring before level 3 start notification is issued are undesirable actions. As a result, steering wheel gripping and surrounding monitoring are less likely to be interrupted at an early stage, and thus enabling the transition to the automated driving at the level 3 without the obligation to monitor the surroundings to be more smoothly performed in the next and subsequent transition scenes.

Next, technical ideas that can be grasped from the first and second embodiments will be added as the first to forth supplementary notes below. The first and second embodiments each show the driver action grasping section 86 that corresponds to the "grip grasping section" and the "monitoring grasping section", the presentation control section 88 that corresponds to the "notification control section", and the HCU 100 that corresponds to the "presentation control device".

(First Supplementary Note)

A presentation control device is used in a subject vehicle equipped with an automated driving function and controls presentation of information on the automated driving function. The presentation control device includes a grip grasping section that grasps whether a driver of the subject vehicle grips a steering wheel, and a notification control section that causes a start notification to be issued to the driver, the start notification indicating a start of autonomous travel control, when a transition is started in the automated driving function based on that a plurality of transition conditions is satisfied, the transition being from driving assistance control with obligation for the driver to grip the steering wheel to the autonomous travel control without obligation for the driver to monitor surroundings and the obligation for the driver to grip the steering wheel. The notification control section issues a hands-on notification that prompts the driver to grip the steering wheel when it is grasped that the driver stops gripping the steering wheel during a period after at least one of the plurality of transition conditions is satisfied and before the start notification is issued.

(Second Supplementary Note)

A presentation control program is used in a subject vehicle equipped with an automated driving function and controls presentation of information on the automated driving function. The presentation control program causes at least one processor to perform the steps of: grasping whether a driver of the subject vehicle grips a steering wheel (S103, S107); issuing a start notification to the driver, the start notification indicating a start of autonomous travel control, when a transition is started in the automated driving function based on that a plurality of transition conditions is satisfied, the transition being from driving assistance control with obligation for the driver to grip the steering wheel to the autonomous travel control without obligation for the driver to monitor surroundings and the obligation for the driver to grip the steering wheel (S110); and issuing a hands-on notification that prompts the driver to grip the steering wheel when it is grasped that the driver stops gripping the steering wheel during a period after at least one of the plurality of transition conditions is satisfied and before the start notification is issued (S113).

(Third Supplementary Note)

A presentation control device is used in a subject vehicle equipped with an automated driving function and controls presentation of information on the automated driving function. The presentation control device includes a monitoring grasping section that grasps whether a driver of the subject vehicle monitors surroundings, and a notification control section that causes a start notification to be issued to the driver, the start notification indicating a start of autonomous travel control, when a transition is started in the automated driving function based on that a plurality of transition conditions is satisfied, the transition being from driving assistance control with obligation for the driver to monitor the surroundings to the autonomous travel control without the obligation for the driver to monitor the surroundings. The notification control section causes a monitoring request notification to be issued, the monitoring request notification prompting the driver to monitor the surroundings when it is grasped that the driver stops monitoring the surroundings during a period after at least one of the plurality of the transition conditions is satisfied and before the start notification is issued.

(Fourth Supplementary Note)

A presentation control program is used in a subject vehicle equipped with an automated driving function and controls presentation of information on the automated driving function. The presentation control program causes at least one processor to perform the steps of: grasping whether a driver of the subject vehicle monitors surroundings (S104, S108); issuing a start notification to the driver, the start notification indicating a start of autonomous travel control, when a transition is started in the automated driving function based on that a plurality of transition conditions is satisfied, the transition being from driving assistance control with obligation for the driver to monitor the surroundings to the autonomous travel control without the obligation for the driver to monitor the surroundings (S110); and issuing a monitoring request notification that prompts the driver to monitor the surroundings when it is grasped that the driver stops monitoring the surroundings during a period after at least one of the plurality of transition conditions is satisfied and before the start notification is issued (S113).

Third Embodiment

FIGS. 8 to 12 each illustrate a third embodiment of the present disclosure that is another modification of the first embodiment. A driving assistance ECU 50a of the third embodiment can permit not only the automated driving at the level 2 with obligation to grip the steering wheel (referred to below as a hands-on level 2), but also the automated driving at the level 2 without the obligation to grip the steering wheel (referred to below as a hands-off level 2). Thus, the automated driving ECU 50b can perform not only a transition from the hands-off level 2 to the autonomous travel control at the level 3 but also a transition from the hands-on level 2 to the autonomous travel control at the level 3.

Available examples of the autonomous travel control at the level 3 performed by the automated driving ECU 50b include not only traffic congestion limited control (referred to below as a traffic congestion level 3) that is performed only in traveling in a traffic congestion, but also area limited control (referred to below as an area level 3) that is performed only in a further specific area in the AD area. The area level 3 permits traveling at a speed higher than that at the traffic congestion level 3.

The automated driving ECU 50b includes an action determination section 63 including a gripping obligation grasping section 79 and a control switching section 78. The gripping obligation grasping section 79 and the control switching section 78 jointly work together to perform a transition condition setting processing (see FIG. 9) to set a transition condition from the driving assistance control to the autonomous travel control.

The gripping obligation grasping section 79 determines whether the driver has obligation to grip the steering wheel in the driving assistance control performed by the driving assistance ECU 50a. In other words, the gripping obligation grasping section 79 grasps whether the driving assistance control being performed by the automated driving ECU 50b is the hands-off level 2 or the hands-on level 2 (S301).

Figure 5:
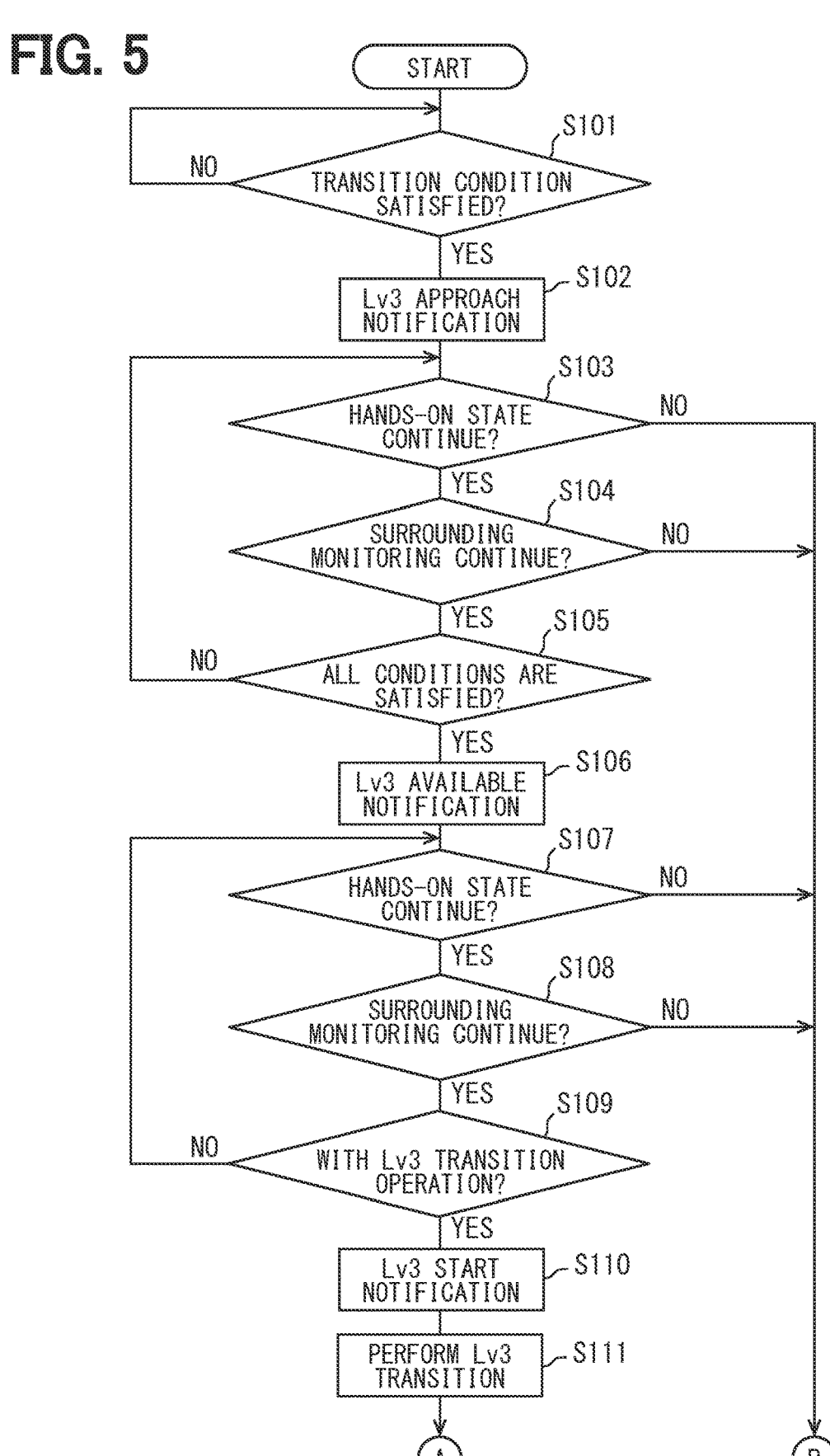
FIG. 5 is a flowchart illustrating details of driving control switching processing executed mainly by an automated driving ECU together with FIG. 6.
Figure 6:
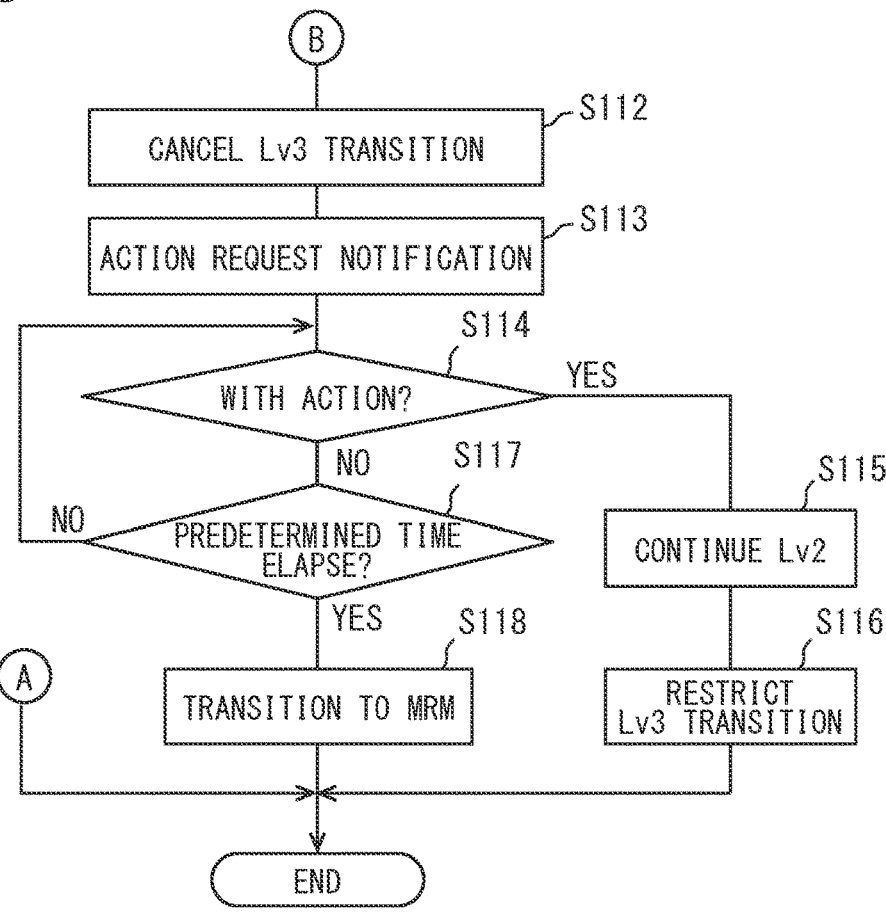
FIG. 6 is a flowchart illustrating details of driving control switching processing together with FIG. 5.

As in the first embodiment, when all of the plurality of preset transition conditions are satisfied, the control switching section 78 permits the transition from the driving assistance control at the level 2 with obligation to monitor the surroundings to the autonomous travel control at the level 3 without the obligation to monitor the surroundings (S105 in FIG. 5). The control switching section 78 changes a transition condition to the level 3 according to whether the driving assistance control being performed has the obligation to grip the steering wheel.

Specifically, when the gripping obligation grasping section 79 determines that the hands-off level 2 is being performed (S301: YES), the control switching section 78 selects a hands-off transition condition (S302). Then, the control switching section 78 determines propriety of the transition from the hands-off level 2 to the autonomous travel control based on the hands-off transition condition (S105 in FIG. 5).

In contrast, when the gripping obligation grasping section 79 determines that the hands-on level 2 is being performed (S301: NO), the control switching section 78 selects a hands-on transition condition (S303). Then, the control switching section 78 permits the transition from the hands-on level 2 to the autonomous travel control based on the hands-on transition condition (S105 in FIG. 5).

The above hands-on transition condition is set more strictly than the hands-off transition condition. In other words, the hands-on transition condition is set stricter than the hands-off transition condition. As a result, the transition from the hands-on level 2 to the autonomous travel control is less likely to be permitted than the transition from the hands-off level 2 to the autonomous travel control. The hands-on transition condition and the hands-off transition condition as described above include a plurality of common individual conditions such as a road type (road shape) condition, a traveling speed condition, and a target condition around the subject vehicle. The hands-on transition condition includes the plurality of individual conditions each of which has a limit that is set more strictly than that set in the hands-off transition condition.

Specifically, the hands-on transition condition includes a road type condition that provides traveling in a straight section. In contrast, the hands-off transition condition includes a road type condition that provides traveling in a straight section or a curved section. As described above, when the road information acquisition section 75 grasps traveling in the curved section, the control switching section 78 permits the transition from the hands-off level 2 to the autonomous travel control, but does not permit the transition from the hands-on level 2 to the autonomous travel control.

Each of the hands-on transition condition and the hands-off transition condition for a transition to the traffic congestion level 3 includes a traveling speed condition that provides that traveling speed of the subject vehicle Am is lower than traffic congestion speed. The hands-on transition condition provides the traffic congestion speed (e.g., 20 km/h) that is set to be lower than the traffic congestion speed (e.g., 30 km/h) in the hands-off transition condition. As a result, the transition from the hands-on level 2 to the traffic congestion level 3 is performed at a lower speed than the transition from the hands-off level 2 to the traffic congestion level 3.

Figure 10:
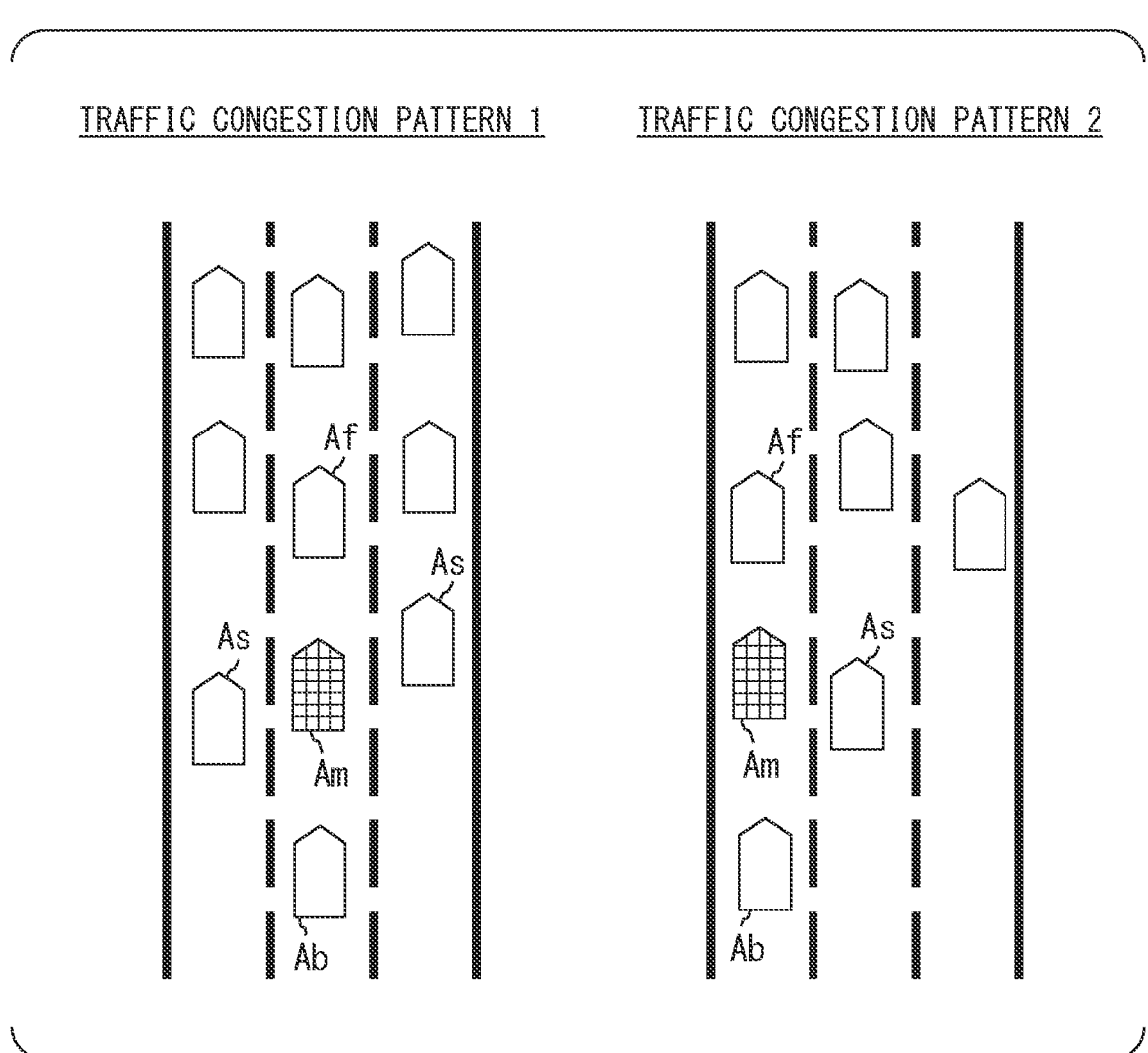
FIG. 10 is a diagram illustrating an example of a plurality of traffic congestion patterns grasped by a traffic congestion grasping section.
Figure 11:
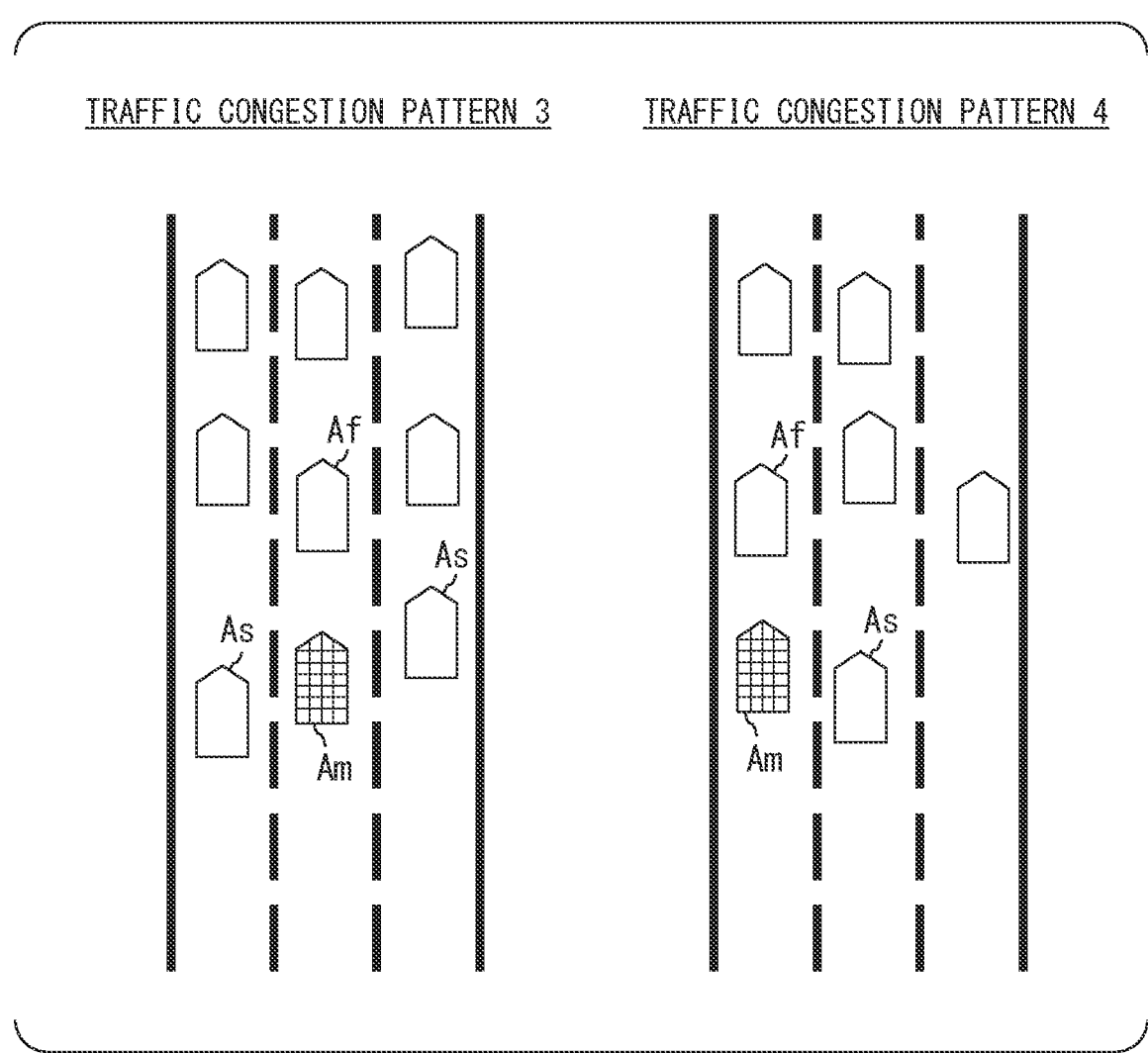
FIG. 11 is a diagram illustrating an example of a plurality of traffic congestion patterns grasped by a traffic congestion grasping section.

The hands-on transition condition for a transition to the traffic congestion level 3 further includes a target condition around the subject vehicle, the target condition providing that the another vehicle grasping section 74 grasps both a preceding vehicle Af (see FIG. 10) and a following vehicle Ab (see FIG. 10). In contrast, the hands-off transition condition includes a target condition around the subject vehicle, the target condition providing that the another vehicle grasping section 74 grasps only the preceding vehicle Af. As described above, traffic congestion patterns 1 and 2 (see FIG. 10), in which both the preceding vehicle Af and the following vehicle Ab are detected, permit both the transition from the hands-off level 2 to the traffic congestion level 3 and the transition from the hands-on level 2 to the traffic congestion level 3. In contrast, traffic congestion patterns 3 and 4 (see FIG. 11), in which the following vehicle Ab is not detected, permits the transition from the hands-off level 2 to the traffic congestion level 3, but does not permit the transition from the hands-on level 2 to the traffic congestion level 3.

Here, the hands-on transition condition may provide that the another vehicle grasping section 74 grasps both of laterally adjacent vehicles As (see FIG. 10). Alternatively, the hands-on transition condition may provide that all of the preceding vehicle Af, the following vehicle Ab, and the laterally adjacent vehicles As are grasped. The laterally adjacent vehicles As travel parallel in respective adjacent lanes. When adjacent lanes exist on respective sides of the subject vehicle lane and the adjacent lanes include an adjacent lane without the laterally adjacent vehicle As, the another vehicle grasping section 74 determines that the laterally adjacent vehicle As is not grasped.

According to setting of the target conditions as described above, the traffic congestion patterns 1 and 2, in which both the preceding vehicle Af and the laterally adjacent vehicle As are detected, permit both the transition from the hands-off level 2 to the traffic congestion level 3 and the transition from the hands-on level 2 to the traffic congestion level 3. In contrast, traffic congestion patterns 5 and 6 (see FIG. 12), in which the laterally adjacent vehicle As is not detected, permits the transition from the hands-off level 2 to the traffic congestion level 3, but does not permit the transition from the hands-on level 2 to the traffic congestion level 3.

The third embodiment described up to here sets the hands-on transition condition for permitting a transition from the driving assistance control with the obligation to grip the steering wheel to the autonomous travel control more strictly than the hands-off transition condition for permitting a transition from the driving assistance control without the obligation to grip the steering wheel to the autonomous travel control. Thus, the transition from the driving assistance control with the obligation to grip the steering wheel to the autonomous travel control can be performed under a traveling state where the driver has a lower load than in the transition from the driving assistance control without the obligation to grip the steering wheel to the autonomous travel control. As a result, the driver can release his/her hand from the steering wheel in a stable traveling state. Thus, the transition to the automated driving at the level 3 without the obligation to monitor the surroundings can be smoothly performed.

When the road information acquisition section 75 grasps traveling in the curved section in the third embodiment, the control switching section 78 permits the transition from the hands-off level 2 to the autonomous travel control, but does not permit the transition from the hands-on level 2 to the autonomous travel control. This configuration causes the driver to take an action to release his/her hand from the steering wheel during traveling in the straight section, but does not cause the driver to take the action in the curved section. As a result, the driver can release his/her hand from the steering wheel with a sense of security. Thus, the transition to the automated driving at the level 3 can be performed more smoothly.

The third embodiment permits the transition from the hands-on level 2 to the traffic congestion level 3 at traveling speed that is set to be lower than traveling speed at which the transition from the hands-off level 2 to the traffic congestion level 3 is permitted. Thus, the driver can release his/her hand from the steering wheel in a stable state after the traveling speed of the subject vehicle Am becomes a low speed.

The third embodiment further permits the transition from the driving assistance control to the traffic congestion level 3 when a situation of a target existing around the subject vehicle Am satisfies the target condition. Additionally, the target condition for permitting the transition from the hands-on level 2 to the traffic congestion level 3 is set more strictly than the target condition for permitting the transition from the hands-off level 2 to the traffic congestion level 3. This configuration causes the driver to take an action to release his/her hand from the steering wheel in a state where a situation around the subject vehicle is stable. As a result, the driver can release his/her hand from the steering wheel with a sense of security. Then, the third embodiment shows the road information acquisition section 75 that corresponds to a "road type grasping section".

Fourth Embodiment

A fourth embodiment of the present disclosure is still another modification of the first embodiment. As in the third embodiment, a driving assistance ECU 50a of the fourth embodiment can perform not only the driving assistance control at the hands-on level 2 (referred to below as hands-on control) but also the driving assistance control at the hands-off level 2 (referred to below as hands-off control). The hands-on control is driving assistance control in which the driver has obligation to not only monitor the surroundings but also grip the steering wheel. The hands-off control is driving assistance control in which the driver has obligation to monitor the surroundings and no obligation to grip the steering wheel.

Here, the function of the hands-off control is legally prohibited to be used in some areas, specifically, in a specific country or region. Thus, the automated driving ECU 50b (see FIGS. 1 to 3) according to the fourth embodiment has a function of restricting the use of the hands-off control and disabling the use in a specific country or region. The automated driving ECU 50b includes a road information acquisition section 75, a control switching section 78, and a notification request section 72 to perform processing related to restriction on the use of the hands-off control.

The road information acquisition section 75 acquires a current position of the subject vehicle Am and grasps an area where the subject vehicle Am currently travels (e.g., a country or a region) based on locator information and map data provided from a locator 35 to an environment recognition section 62. The road information acquisition section

75 determines whether the area where the subject vehicle Am travels is an area where traveling by the hands-off control is possible (referred to below as a hands-off available area) or an area where traveling by the hands-off control is prohibited (referred to below as a hands-off prohibited area). The information on whether the hands-off control is possible in each country or region may be preliminarily recorded in the map data, or may be received by an in-vehicle communication device 39.

When the subject vehicle Am travels in the hands-off prohibited area, the control switching section 78 cooperates with the driving assistance ECU 50a to restrict the use of the hands-off control. According to the restriction on the use of the hands-off control performed by the control switching section 78, the hands-on notification is issued when the driver continues to interrupt gripping of the steering wheel for a predetermined time or more. Then, when the interruption of gripping of the steering wheel continues even after the hands-on notification is issued, travel control for automatically stopping the subject vehicle Am on a road on which the subject vehicle Am is traveling is started.

The control switching section 78 continues a state in which the use of the hands-off control is permitted when the subject vehicle Am moves from the hands-off available area to another hands-off available area. In contrast, when the subject vehicle Am moves from the hands-off available area to the hands-off prohibited area, the control switching section 78 switches the state to a state in which the use of the hands-off control is prohibited. The control switching section 78 continues a prohibited state of the hands-off control until a specific user operation (driver operation) is performed by the driver when the use of the hands-off control is temporarily prohibited. Thus, when the subject vehicle Am moves from the hands-off prohibited area to the hands-off available area, the control switching section 78 continues the state in which the use of the hands-off control is prohibited without performing automatic switching. For example, the control switching section 78 continues the state in which the use of the hands-off control is prohibited until a power supply of the subject vehicle Am is temporarily turned off.

The notification request section 72 causes area change notification to be issued, the area change notification indicating a change in a determination result, when the road information acquisition section 75 changes the determination result of whether the area is a hands-off available area. After the result of determination is changed, the notification request section 72 causes the area change notification to be issued within a predetermined time (e.g., about several tens of seconds to 1 minute) by outputting a request to issue the area change notification to an information coordination section 82. The area change notification indicates to a passenger such as a driver that information indicating whether the hands-off control is possible changes. Specifically, the area change notification when the subject vehicle Am moves from the hands-off available area to the hands-off prohibited area causes at least one of an HUD 23 and a meter display 21 to display a message such as "hands-off is not available". In contrast, the area change notification when the subject vehicle Am moves from the hands-off prohibited area to the hands-off available area causes at least one of an HUD 23 and a meter display 21 to display a message such as "Having entered area where hands-off is available. Perform predetermined operation to cause hand-off to be available". Then, an audio device 24 may reproduce a voice message similar to the message displayed on each display device. The area change notification is not issued for movement from the hands-off prohibited area to another hands-off prohibited area and movement from the hands-off available area to another hands-off available area.

Next, details of each of hands-off restriction processing of prohibiting use of the hands-off control and area notification processing of issuing the area change notification will be described below with reference to FIGS. 13 and 14, and FIGS. 1 to 3. The hands-off restriction processing and the area notification processing are started by the automated driving ECU 50b having finished startup processing after the power supply of the subject vehicle Am is switched to an on-state.

Figure 13:
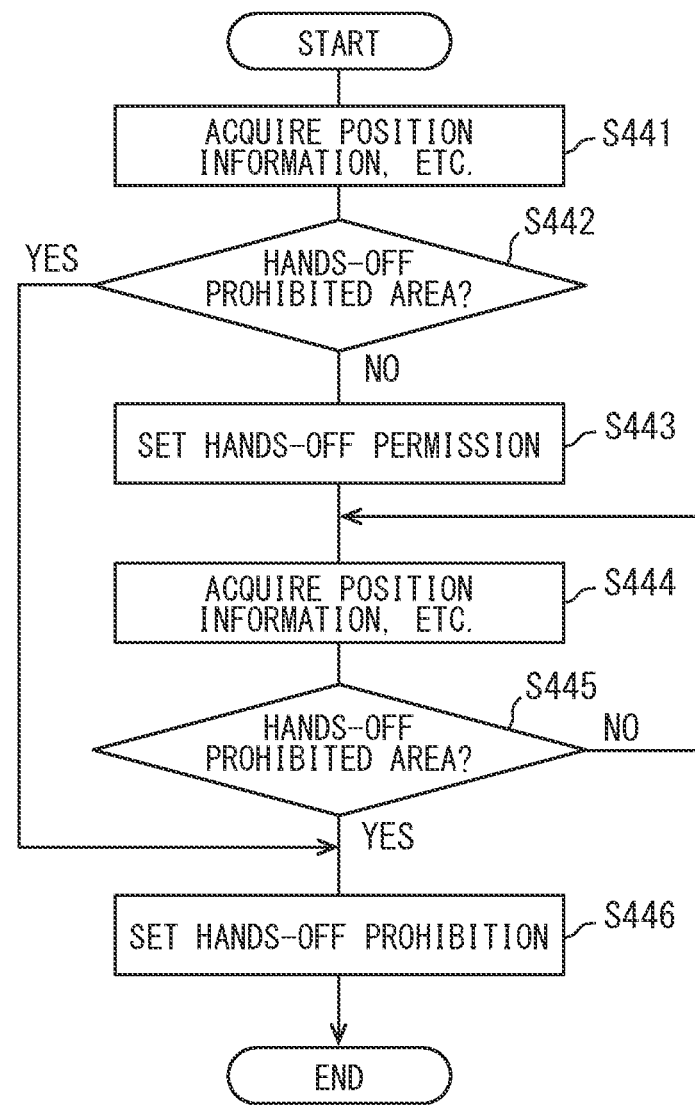
FIG. 13 is a flowchart illustrating details of hands-off restriction processing performed by an automated driving ECU according to a fourth embodiment.

FIG. 13 illustrates the hands-off restriction processing including S441 in which position information and the like are acquired, and the processing proceeds to S442. It is determined in S442 whether the subject vehicle Am is located in a hands-off available area based on the position information acquired in S441. When it is determined that the subject vehicle Am is located in the hands-off prohibited area in S442, prohibition of use of the hands-off control is set to terminate the present hands-off limiting processing in S446. In contrast, when it is determined that the subject vehicle Am is located in the hands-off available area in S442, the processing proceeds to S443.

Permission of use of the hands-off control is set in S443, and the processing proceeds to S444. As in S441, position information and the like are acquired in S444, and the processing proceeds to S445. It is determined again in S445 whether the subject vehicle Am is located in a hands-off available area based on the position information acquired in S444. When the subject vehicle Am is traveling in the hands-off available area, the state in which the use of the hands-off control is permitted is continued by repeating the processing of S444 and S445. Then, when the subject vehicle Am moves from the hands-off available area to the hands-off prohibited area, the processing proceeds from S445 to S446, and the prohibition of use of the hands-off control is set to terminate the present hands-off limiting processing.

Figure 14:
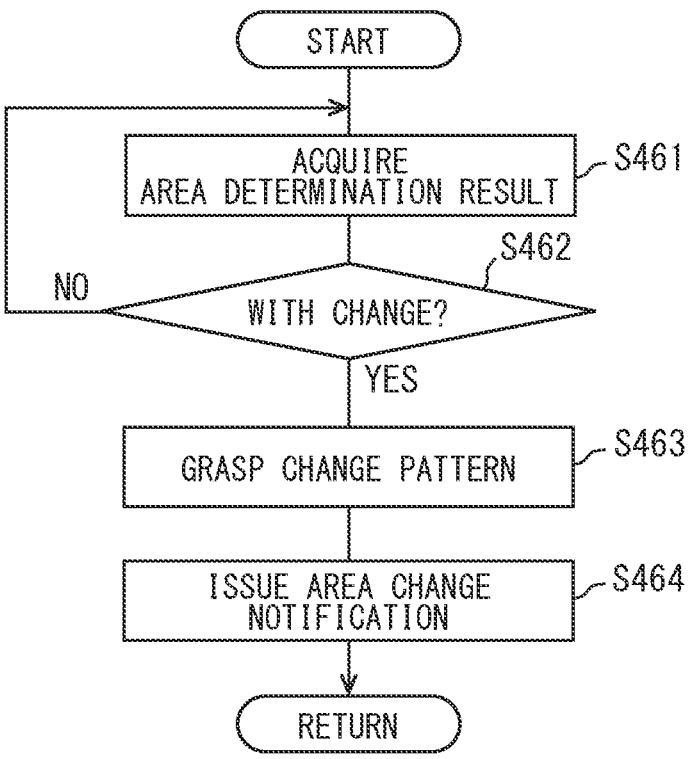
FIG. 14 is a flowchart illustrating details of area notification processing.

FIG. 14 illustrates the area notification processing that is repeatedly started by the automated driving ECU 50b during a period in which an automated driving system 50 is started up. The area notification processing includes S461 in which a result of area determination (see S442) in the hands-off restriction processing is acquired, and the processing proceeds to S462. It is determined in S462 whether the determination result acquired in S461 changes. When the result of the area determination does not change, the processing of S461 and S462 is repeated. In contrast, when the result of the area determination changes, the processing proceeds from S462 to S463.

A change pattern of the result of the area determination is grasped in S463, and the processing proceeds to S464. It is grasped in S463 whether which of change patterns of determination result occurs, the change patterns including a pattern in which a result is changed to the hands-off prohibited area from the hands-off available area and a pattern in which a result is changed to the hands-off available area from the hands-off prohibited area. Then, a notification request is output to the information coordination section 82 in S464 to issue the area change notification corresponding to the change pattern grasped in S463, and the present area notification processing terminates. Based on the notification request output in S464, the area change notification is issued by an HMI system 10.

The fourth embodiment described up to here allows the area change notification to indicate a change in a determination result of whether the subject vehicle Am travels in a hands-off available area. Thus, even in a travel environment in which propriety of traveling according to hands-off control changes as the subject vehicle Am moves, the driver can appropriately grasp whether the driver can release his/her hand from the steering wheel. As a result, convenience of the automated driving can be ensured.

The fourth embodiment also allows a state in which the use of the hands-off control is restricted to be continued even when the subject vehicle Am moves from the hands-off prohibited area to the hands-off available area. This configuration enables avoiding a situation in which the driver feels annoyed due to a system change in which availability of the hands-off control changes every time the vehicle crosses the country, for example. Then, the fourth embodiment shows the road information acquisition section 75 that corresponds to an "area determination section", and the control switching section 78 that corresponds to a "function restriction section".

Other Embodiments

Although the plurality of embodiments of the present disclosure have been described above, the present disclosure is not to be construed as being limited to the above-described embodiments, and can be applied to various embodiments and combinations without departing from the gist of the present disclosure.

The first and second embodiments each allow monitoring whether the driver grips the steering wheel and monitors the surroundings in the period before transition to the level 3. In contrast, a first modification of the first and second embodiments allows only the hands-on notification to be issued when the hands-on state is interrupted, and does not allow the monitoring request notification to be issued when the surrounding monitoring is interrupted. Then, a second modification of the first and second embodiments allows only the monitoring request notification to be issued when the surrounding monitoring is interrupted, and does not allow the hands-on notification to be issued when the hands-on state is interrupted.

Third and fourth modifications of the first and second embodiments are different in the period before transition to the level 3. The third modification defines a period from issuance of the level 3 available notification to issuance of the level 3 start notification as the period before transition to the level 3. The fourth modification defines a period from issuance of the level 3 approach notification to issuance of the level 3 available notification as the period before transition to the level 3.

An aspect of each of the level 3 approach notification, the level 3 available notification, and the level 3 start notification can be changed as appropriate. For example, these notifications may be issued with a change in emission color of an ambient display provided around the driver's seat.

A fifth modification of the above embodiments allows the automated driving ECU 50b and the HCU 100 to cooperate to implement the function of the automated driving control apparatus. The fifth modification allows a driver action grasping section 86 to implement a function of grasping whether the steering wheel is gripped and whether the surroundings are monitored. Additionally, a presentation control section 88 implements a function of issuing the level 3 start notification and the action request notification.

Then, a sixth modification of the above embodiments allows one in-vehicle ECU to provide a function of each of the automated driving ECU 50b and the HCU 100. The one in-vehicle ECU includes not only the environment recognition section 62, the action determination section 63, and the control execution section 64 of the above-described embodiments, but also functional sections corresponding to the information acquisition section 81, the driver action grasping section 86, and the presentation control section 88, the sections being constructed according to a function control program. The sixth modification eliminates functional sections corresponding to the information coordination sections 61 and 82.

The fifth and sixth modifications each show the driver action grasping section 86 that corresponds to the "grip grasping section" and the "monitoring grasping section", and the presentation control section 88 that corresponds to the "notification control section". The fifth modification shows a system including a plurality of ECUs such as the automated driving ECU 50b and the HCU 100, the system corresponding to the "automated driving control apparatus".

Then, a seventh modification of the above embodiments allows one automated driving ECU to provide a function of each of the driving assistance ECU 50a and the automated driving ECU 50b. That is, the automated driving ECU 50b of the seventh modification is equipped with the function of the driving assistance ECU 50a. The seventh modification shows an integrated automated driving ECU that corresponds to the "automated driving control apparatus".

An eighth modification of the fourth embodiment allows the driving assistance ECU 50a to perform processing related to restriction on use of the hands-off control. That is, the driving assistance ECU 50a includes functional sections corresponding to the road information acquisition section 75, the control switching section 78, the notification request section 72, and the like described in the fourth embodiment, and a processor of the driving assistance ECU 50a performs the hands-off restriction processing and the area notification processing. The eighth modification may allow elimination of the automated driving ECU 50b that implements the automated driving function at the level 3 from the automated driving system 50. The eighth modification shows the driving assistance ECU 50a that corresponds to an "automated driving computer".

A ninth modification of the fourth embodiment allows notification indicating movement to an area to be issued even for movement from the hands-off prohibited area to another hands-off prohibited area and movement from the hands-off available area to another hands-off available area. Such notification is preferably performed in a lower visual attraction than area change notification.

Each function provided by the automated driving ECU and the HCU in the above embodiments can be provided by software and hardware for executing the software, only software, only hardware, or a combination thereof. When such a function is provided by an electronic circuit as hardware, each function can also be provided by a digital circuit including many logic circuits or an analog circuit.

Each processor of the above-described embodiments may be individually mounted on a printed circuit board, or may be mounted on an application specific integrated circuit (ASIC), an FPGA, or the like. Additionally, a form of a storage medium (non-transitory tangible storage medium) that stores various programs and the like may also be changed as appropriate. The storage medium is not limited to a configuration provided on a circuit board, and may be provided in the form of a memory card or the like, the memory card or the like being inserted into a slot to be electrically connected to a control circuit such as an automated driving ECU or an HCU. The storage medium also may be an optical disk serving as a copy base of a program to the automated driving ECU or the HCU, a hard disk drive of the automated driving ECU or the HCU, or the like.

A vehicle equipped with the automated driving system and the HMI system is not limited to a general private car, and may be a vehicle for a rental car, a vehicle for a manned taxi, a vehicle for ride-sharing, a cargo vehicle, a bus, or the like. The vehicle equipped with the automated driving system and the HMI system may be a right-hand drive vehicle or a left-hand drive vehicle. Additionally, a traffic environment in which the vehicle travels may be a traffic environment on a premise of left-hand traffic or a traffic environment on a premise of right-hand traffic. The automated driving control and the information presentation according to the present disclosure may be appropriately optimized according to the road traffic law of each country and region, a steering wheel position of the vehicle, and the like.

The control unit and the method thereof described in the present disclosure may be implemented by a dedicated computer constituting a processor programmed to execute one or multiple functions embodied by a computer program. Alternatively, the device and the method thereof described in the present disclosure may be implemented by a dedicated hardware logic circuit. Alternatively, the device and the method thereof described in the present disclosure may be implemented by one or more dedicated computers configured by a combination of a processor executing a computer program and one or more hardware logic circuits. The computer program may also be stored in a computer readable non-transitory tangible storage medium as computer-executable instructions.

What is claimed is:

1. An automated driving control apparatus that enables traveling of a subject vehicle using an automated driving function, the automated driving control apparatus comprising:

at least one of (i) a circuit and (ii) a processor with a memory storing computer program code executable by the processor configured to serve as:

a grip grasping section that is configured to grasp whether a driver of the subject vehicle grips a steering wheel;

a control switching section that is configured to permit, based on that a plurality of transition conditions is satisfied, a transition from a driving assistance control with obligation for the driver to grip the steering wheel to an autonomous travel control without obligation for the driver to monitor surroundings and the obligation for the driver to grip the steering wheel; and a notification control section that causes a start notification to be issued to the driver, the start notification indicating a start of the autonomous travel control, wherein the notification control section issues a hands-on notification that prompts the driver to grip the steering wheel when it is grasped that the driver stops gripping the steering wheel during a period after at least one of the transition conditions is satisfied and before the start notification is issued, and when the hands-on notification is issued, the control switching section suspends permission of the transition to the autonomous travel control after the plurality of transition conditions is satisfied.

2. The automated driving control apparatus according to claim 1, wherein the control switching section stops the transition to the autonomous travel control when it is grasped that the driver stops gripping the steering wheel during a period after at least one of the transition conditions is satisfied and before the start notification is issued.

3. The automated driving control apparatus according to claim 2, wherein the control switching section changes the driving assistance control to manual driving performed by the driver when stopping the transition to the autonomous travel control.

4. The automated driving control apparatus according to claim 2, wherein the control switching section continues the driving assistance control when it is grasped that the steering wheel is gripped within a predetermined time after the hands-on notification is started.

5. The automated driving control apparatus according to claim 4, wherein the control switching section restricts the transition to the autonomous travel control when the driving assistance control is continued based on grasping that the steering wheel is gripped.

6. The automated driving control apparatus according to claim 1, wherein the notification control section stops issuing the start notification for a predetermined time when the hands-on notification is issued.

7. A non-transitory computer readable storage medium storing an automated driving control program that enables traveling of a subject vehicle using an automated driving function, the automated driving control program causing at least one processor to perform the steps of:

grasping whether a driver of the subject vehicle grips a steering wheel;

permitting a transition from driving assistance control with obligation for the driver to grip the steering wheel to autonomous travel control without obligation for the driver to monitor surroundings and the obligation for the driver to grip the steering wheel based on that a plurality of transition conditions is satisfied;

issuing a start notification to the driver, the start notification indicating a start of the autonomous travel control;

issuing a hands-on notification that prompts the driver to grip the steering wheel when it is grasped that the driver stops gripping the steering wheel during a period after at least one of the transition conditions is satisfied and before the start notification is issued; and suspending permission of the transition to the autonomous travel control after the plurality of transition conditions is satisfied when the hands-on notification is issued.

* * * * *